US009046635B2

(12) United States Patent
Bae et al.

(10) Patent No.: US 9,046,635 B2
(45) Date of Patent: Jun. 2, 2015

(54) BACKLIGHT ASSEMBLY, AND LIQUID CRYSTAL DISPLAY MODULE AND LIQUID CRYSTAL DISPLAY DEVICE HAVING THE SAME

(75) Inventors: Hyun-Chul Bae, Cheonan-si (KR); Jae-Sang Lee, Cheonan-si (KR); Seong-Sik Choi, Seoul (KR); Hee-June Kwak, Yongin-si (KR); Sang-Hyeok Lee, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 74 days.

(21) Appl. No.: 13/104,057

(22) Filed: May 10, 2011

(65) Prior Publication Data
US 2011/0292315 A1    Dec. 1, 2011

(30) Foreign Application Priority Data

May 28, 2010  (KR) .......................... 10-2010-0050335

(51) Int. Cl.
G02F 1/1333   (2006.01)
F21V 8/00    (2006.01)
G02F 1/1335   (2006.01)

(52) U.S. Cl.
CPC ............ *G02B 6/0088* (2013.01); *G02B 6/0091* (2013.01); *G02F 1/133308* (2013.01); *G02F 1/133608* (2013.01); *G02F 1/133615* (2013.01); *G02F 2001/133314* (2013.01); *G02F 2001/133328* (2013.01)

(58) Field of Classification Search
CPC .......................................... G02F 2001/133328
See application file for complete search history.

(56) References Cited

U.S. PATENT DOCUMENTS

| 5,422,751 | A | 6/1995 | Lewis et al. |
| 5,504,605 | A | 4/1996 | Sakuma et al. |
| 6,166,778 | A | 12/2000 | Yamamoto et al. |
| 6,175,396 | B1 * | 1/2001 | Kim et al. ....................... 349/58 |
| 6,762,807 | B2 | 7/2004 | Lee et al. |

(Continued)

FOREIGN PATENT DOCUMENTS

| CN | 1444071 A | 9/2003 |
| CN | 1920644 A | 2/2007 |

(Continued)

OTHER PUBLICATIONS

European Search Report dated: Sep. 27, 2011.

(Continued)

*Primary Examiner* — Richard Kim
*Assistant Examiner* — Ryan Crockett
(74) *Attorney, Agent, or Firm* — Cantor Colburn LLP

(57) ABSTRACT

A liquid crystal display ("LCD") module includes a backlight assembly emitting light, a LCD panel overlapping the backlight assembly, and an upper cover. The backlight includes a light source module emitting the light, a light guide plate ("LGP") including edges and a middle portion, and a LGP support overlapping the edges of the LGP. The LGP support includes a plurality of LGP supporting pieces connected to each other so as to form a polygonal shape, each of the LGP supporting pieces including a LGP supporting portion including a LGP supporting surface overlapping the edges of the LGP, and the LGP supporting surfaces of each of the LGP supporting pieces of the LGP support are placed on a same plane. Opposing LGP supporting pieces are interconnected by an LCD module mounting member.

22 Claims, 25 Drawing Sheets

(56) References Cited

U.S. PATENT DOCUMENTS

| | | |
|---|---|---|
| 6,954,238 B2 | 10/2005 | Liu et al. |
| 7,775,701 B2 | 8/2010 | Lee et al. |
| 8,033,707 B2 | 10/2011 | Kim et al. |
| 2002/0180661 A1 | 12/2002 | An |
| 2006/0066768 A1* | 3/2006 | Lee et al. ............... 349/58 |
| 2006/0274224 A1* | 12/2006 | Jeong ..................... 349/58 |
| 2007/0279581 A1 | 12/2007 | Chang |
| 2008/0018826 A1* | 1/2008 | Bae et al. ............... 349/58 |
| 2008/0123370 A1 | 5/2008 | Huang et al. |
| 2008/0266483 A1 | 10/2008 | Kim |
| 2008/0291354 A1* | 11/2008 | Oh ......................... 349/58 |
| 2008/0291356 A1* | 11/2008 | Kim ....................... 349/58 |
| 2009/0279015 A1 | 11/2009 | Lee et al. |
| 2009/0310288 A1* | 12/2009 | Lee ................... 361/679.01 |
| 2010/0225850 A1* | 9/2010 | Hashimoto ............. 349/62 |
| 2012/0127393 A1* | 5/2012 | Hamada .................. 349/58 |

FOREIGN PATENT DOCUMENTS

| | | |
|---|---|---|
| CN | 101082722 A | 12/2007 |
| CN | 101418931 A | 4/2009 |
| CN | 101476697 A | 7/2009 |
| CN | 101561582 A | 10/2009 |
| GB | 2 427 299 B | 11/2007 |
| KR | 1020020031700 A | 5/2002 |
| KR | 1020060020351 A | 3/2006 |
| KR | 1020060088346 A | 8/2006 |
| KR | 1020070076960 A | 7/2007 |
| KR | 1020080074459 A | 8/2008 |
| KR | 1020090098048 A | 9/2009 |
| KR | 1020090117329 A | 11/2009 |
| TW | 262955 | 4/2005 |

OTHER PUBLICATIONS

Chinese Office Action for Chinese Patent Application No. 2011101403171 dated Jul. 1, 2014 with English Translation.

\* cited by examiner

BACKLIGHT ASSEMBLY, AND LIQUID CRYSTAL DISPLAY MODULE AND LIQUID CRYSTAL DISPLAY DEVICE HAVING THE SAME

This application claims priority to Korean Patent Application filed on May 28, 2010 and assigned Serial No. 10-2010-0050335, and all the benefits accruing therefrom under 35 U.S.C. §119, the entire disclosure of which is hereby incorporated by reference.

BACKGROUND OF THE INVENTION

1. Field of the Invention

The invention relates generally to a liquid crystal display ("LCD") device, an LCD module and a backlight assembly of the LCD module.

2. Description of the Related Art

Conventionally, the LCD module has an LCD panel displaying images in response to electrical signals provided thereto, according to the change in arrangement of liquid crystal molecules and light transmittance, a backlight assembly supplying light to the LCD panel, and covers supporting and fixing the LCD panel and the backlight assembly. The LCD module is fixedly attached to a separate case, and provided to ultimate customers as the LCD device.

The LCD module is used in various kinds of display devices and classified into small-sized LCD modules for cellular phones, mid-sized LCD modules for desktop monitors, and large-sized LCD modules for television sets.

As the size of the LCD module increases, a weight of the LCD module also increases and its components and structure become more complicated in order to assure higher reliability such as shock-resistance and the like. Especially, the LCD module for use in either a desktop monitor or a television set may be provided with an additional light guide plate, a support supporting the light guide plate or the light source module, and a closed-type bottom container supporting the entire backlight assembly. The closed-type bottom container has a bottom section, and side walls upwardly extending from the bottom section, for isolating the light source module, the light guide plate and the light guide plate support from the exterior of the backlight assembly, thereby leading to an increased overall depth and weight of the LCD module.

The complicated structure in the closed-type bottom container for mounting circuit elements and connection to the LCD device results in an increased overall dimension of the LCD module. Even though the closed bottom container is made partially opened so as to mount some of circuit elements therewith, the general shape of the bottom container is still of a closed structure, so a reduction in thickness and weight of the LCD device and module are still required.

The backlight assembly included in the LCD module has a plurality of light sources. Each light source converts electrical energy to optical and thermal energy. Optical energy is desirable since it is delivered from the backlight assembly to the liquid crystal panel for displaying images, while thermal energy should be eliminated because of its negative influence to the liquid crystal molecules or other optical elements. However, since more light sources are required as the dimension of the liquid crystal module and device increases, and since a narrower thermal path is provided as the thickness of the liquid crystal module and device decreases, the image quality of the LCD module and device will deteriorate owing to excessive heat.

Accordingly, a structure for implementing more effective heat dissipation in the liquid crystal display module with a plurality of light sources is required. The LCD device includes the LCD module disposed between an upper case on the LCD panel side of the LCD module, and a lower case on the backlight assembly side of the LCD module. On the lower case is mounted an external device, by which the LCD device can be hung on a wall of a building or placed on a table. Here, it is appreciated that since the external device needs additional parts for mounting on the lower case, the LCD device tends to become larger and heavier. Moreover, such a larger dimension and weight of the LCD device may often decrease stability and reliability of the external device, so simplification of mounting structure of the LCD device is essentially required.

LCD device suppliers purchase individual LCD modules with a liquid crystal panel and a backlight assembly, and assemble them together with the upper and lower cases separately prepared, to manufacture a final LCD device. To the LCD device, an additional element that receives a combined image signal of a primitive image and sound signal, and splits the combined image signal into an image signal for LCD module and an acoustic signal for a speaker is installed. The LCD device is finally completed by the process of installing the additional element on the backside of the assembled LCD module, and combining the upper and lower cases with the LCD module in between. Here, since the lower case is combined with the upper case along an edge thereof, the sectional areas of both the lower and upper cases are similar to each other.

A thickness of the LCD device often becomes larger because LCD device manufacturers do not tend to seriously consider the location of the additional element disposed on the back of the LCD module, and design of the lower case with uniform depth for combining with the upper case. Further, even though the LCD device manufacturer makes a change in the depth of the lower case depending upon the location of the additional element, the lower case is combined with the upper case with constant interval between the cases throughout the LCD module; hence, limitation is caused in reducing the thickness of the LCD device. Still further, the manufacturing process becomes more complicated for those LCD device manufacturers as the lower cases becomes larger in some applications such as in a large sized television set. Accordingly, a structural improvement of the LCD module which promotes both easy and effective mounting of the additional elements to the LCD module, and the reduction in an overall size of the LCD device, is desired.

BRIEF SUMMARY OF THE INVENTION

An exemplary embodiment of the invention provides a light and compact liquid crystal display ("LCD") device, by improving the shape and structure of a light guide plate ("LGP") support.

Another exemplary embodiment of the invention provides an LCD module and an LCD device with improved quality, by effectively dissipating heat originated from light sources of the LCD module through the LGP support.

Still another exemplary embodiment of the invention provides a thin and light LCD device with improved structure for installation of external components to the LCD device for manufacturing the LCD device with more stability and endurance.

A further exemplary embodiment of the invention provides the LCD device including additional elements which can be easily mounted and replaced, and a reduced thickness and size, partly owing to improvements in a mounting structure of the additional elements attached to the LCD module and in a shape of the lower case of the LCD device.

In one exemplary embodiment of the invention, there is provided an LCD module with a backlight assembly. The backlight assembly has a light source module, a LGP and an LGP support. The LGP has edges, some of which are near to the light source module, and a middle portion. The LGP support overlaps the edges of the LGP. The LGP support has a plurality of an LGP supporting piece forming a polygon frame shape. Each of the LGP supporting pieces has a LGP supporting portion which supports edges of the LGP, with a LGP supporting surface, and a peripheral portion which extends from the LGP supporting portion in a direction opposite from the middle portion of the LGP. Each of the LGP supporting surfaces of the LGP supporting pieces lies substantially on a same plane. In other words, the LGP supporting pieces are assembled to make heights of the LGP supporting surfaces the same, and to make the LGP supporting portions flat within the whole LGP support.

A LGP supporting piece includes an interconnecting portion to which adjacent LGP supporting piece is connected to each other. The interconnecting portion includes the LGP supporting surface and a side surface bent from the LGP supporting surface. The side surface may extend to the peripheral portion of the LGP supporting pieces, and side surfaces of the adjacent LGP supporting pieces are interconnected either directly or indirectly to each other to have the LGP supporting surfaces substantially on the same plane. Namely, at the interconnecting portion, the adjacent LGP supporting pieces are connected without any step therebetween. For interconnection, the side surfaces of the adjacent LGP supporting pieces are combined while materials of the adjacent LGP supporting pieces are mixed together by friction stir welding ("FSW").

Alternatively, the side surfaces may be indirectly interconnected by means of connecting piece, to which is connected the peripheral portions of the adjacent LGP supporting pieces. The LGP supporting piece has a connection piece reception portion on its peripheral portion. The connection piece has an anchor to be connected with the peripheral portion of the LGP supporting piece. Since the connecting piece is located on peripheral portion of the LGP supporting piece, a part of the connecting piece may be exposed to an outside of the LGP support. Especially, an annexed portion, on which anchors meet, may have a part in between the anchors to be exposed to the outside of the LGP support. The connecting piece may have a LGP reception portion for preventing movement of a corner of the LGP which is located outer side of the effective luminescence area. Also, the connecting piece may have securing protrusion which is combined with an overhang of a light controller disposed over the LGP.

The peripheral portion has a first mounting wall perpendicular to the LGP supporting surface, a second mounting wall parallel to and outwardly spaced apart from the first mounting wall, and an embedding space formed between the first and second mounting walls. A light source module may be attached on the first mounting wall. Either a power wiring providing power to the light source module or an intermediate support, placed on the backlight assembly and supporting a liquid crystal ("LC") panel, may be accommodated in the embedding space.

The plurality of LGP supporting pieces make a closed square LGP support and form an opening at the internal space of the LGP support. A reflector additionally located between the LGP support and the LGP helps even distribution of light within the LGP while the reflector is exposed to an outer side of the LGP support through the opening. An opposing surface of the LGP supporting surface is also exposed to outside of the LGP support. The planar area of the reflector is similar to a planar area of the bottom of the LGP, and from about 30 percent to about 90 percent of the area of the reflector may be exposed to the outside of the LGP support. In other words, about 10 percent to about 70 percent of the area of the LGP may be supported by the LGP support.

In another exemplary embodiment of the invention, the LCD module has a backlight assembly emitting light, the LC panel being placed over and receiving light from the backlight assembly to display images within its displaying area, and an upper cover having a front portion to expose the displaying area by overlapping the edges of the LC panel and a lateral portion combined with the backlight assembly.

The backlight assembly has a light source module emitting light, an LGP having a plurality of edges, some of which are light incident surfaces in the vicinity of the light source module, and a middle portion providing light to the image displaying area, and a LGP support supporting the edges of the LGP. The LGP support has a plurality of LGP supporting piece to form polygon frame shape of the LGP support, and each of the LGP supporting surfaces of the LGP supporting pieces are located substantially on a same plane. In other words, the heights of the LGP supporting surfaces are the same. Accordingly, at the interconnecting portion where LGP supporting pieces are met, the LGP supporting surfaces are connected without any steps formed therebetween.

The polygonal LGP support of the backlight assembly forms an opening that corresponds to the middle portion of the LGP. Also, a reflector is located between the LGP and LGP support. The reflector may be exposed to an outside of the LCD module through the opening of the LGP support.

The LGP supporting piece has a peripheral portion extending from the LGP supporting portion in a direction opposite to the LGP middle portion. A connecting piece, connecting adjacent LGP supporting pieces to each other, may be located on the peripheral portion. The connecting piece may accommodate a corner of the LGP with an LGP reception portion. An end portion of one LGP supporting piece has a lateral surface perpendicularly bent from the LGP supporting surface, the lateral surface combined with another lateral surface perpendicularly bent from the LGP supporting surface of the adjacent LGP supporting piece.

In still another exemplary embodiment of the invention, an LCD device has an LC panel which displays images, an LCD module which accommodates a light emitting backlight assembly, an upper case which is located to the side of the LC panel, a lower case which is located to the side of the backlight assembly of the LCD module and is combined with the upper case to fix the LCD module, and a LCD module mounting member which is located between the LCD module and the lower case to fix the LCD module to the lower case. The backlight assembly has a light source module, an LGP adjacent to the light source module, and a LGP support supporting edges of the LGP. The LGP support includes a plurality of LGP supporting pieces and may have at least a pair of the LGP supporting pieces facing each other and connected each other via the LCD module mounting member.

The plurality of the LGP supporting pieces form a LGP support of a closed square to have an opening at an internal space. The LCD module mounting member may overlap with the opening. The LCD module mounting member extends parallel to gravity, when the LCD device is placed in a viewing position. At least one of the LGP supporting pieces may have a light source module mounted thereon, and the LCD module mounting member may be connected to the LGP supporting piece having the light source module. The LCD module mounting member may either be in contact with the lower case, or be connected with an external component with the lower case therebetween.

The heat transfer coefficient of the LCD module mounting member may be the same or higher than 15 watts per meter Kelvin (W/mK) for efficient heat dissipation. The lower case may have heat dissipation portion at the point of contact with the LCD module, and may have a heat transfer coefficient that is the same or higher than 15 W/mK. A thermal insulator may be formed around the heat dissipation portion of the lower case, and may be located around edges of the lower case.

In another exemplary embodiment of the invention, the LCD device has an LC panel displaying images, an LCD module accommodating a light emitting backlight assembly, an additional component receiving primitive display signals and producing modified signals while being mounted on the side of the backlight assembly, an upper case located on the side of the LC panel, a lower case located on the side of the backlight assembly to fix LCD module together with the upper case while having passage in connection with the location of the external component, and a lid shielding the external component by covering the passage of the lower case.

The additional component is mounted by LCD device manufacturer, and may be a main board converting power or a primitive image received from an external source signal into a modified signal suitable for the LCD module. The additional component may be a speaker converting sound signals received from an outside of the LCD device into a modified signal for the viewers of the LCD device.

The passage of the lower case may be surrounded by the heat dissipation portion. The heat dissipation portion may be surrounded by a thermal insulator. An additional component may be mounted on the LCD module by passing through the passage of the lower case. The passage of the lower case may be surrounded by the heat dissipation portion of the lower case which may be connected to a ground pattern formed on the additional component. An external component may be mounted on the additional component for mounting the LCD device to an outside feature.

BRIEF DESCRIPTION OF THE DRAWINGS

The above and other features of certain exemplary embodiments of the invention will be more apparent from the following description taken in conjunction with the accompanying drawings, in which.

DETAILED DESCRIPTION OF INVENTION

Figure 1:
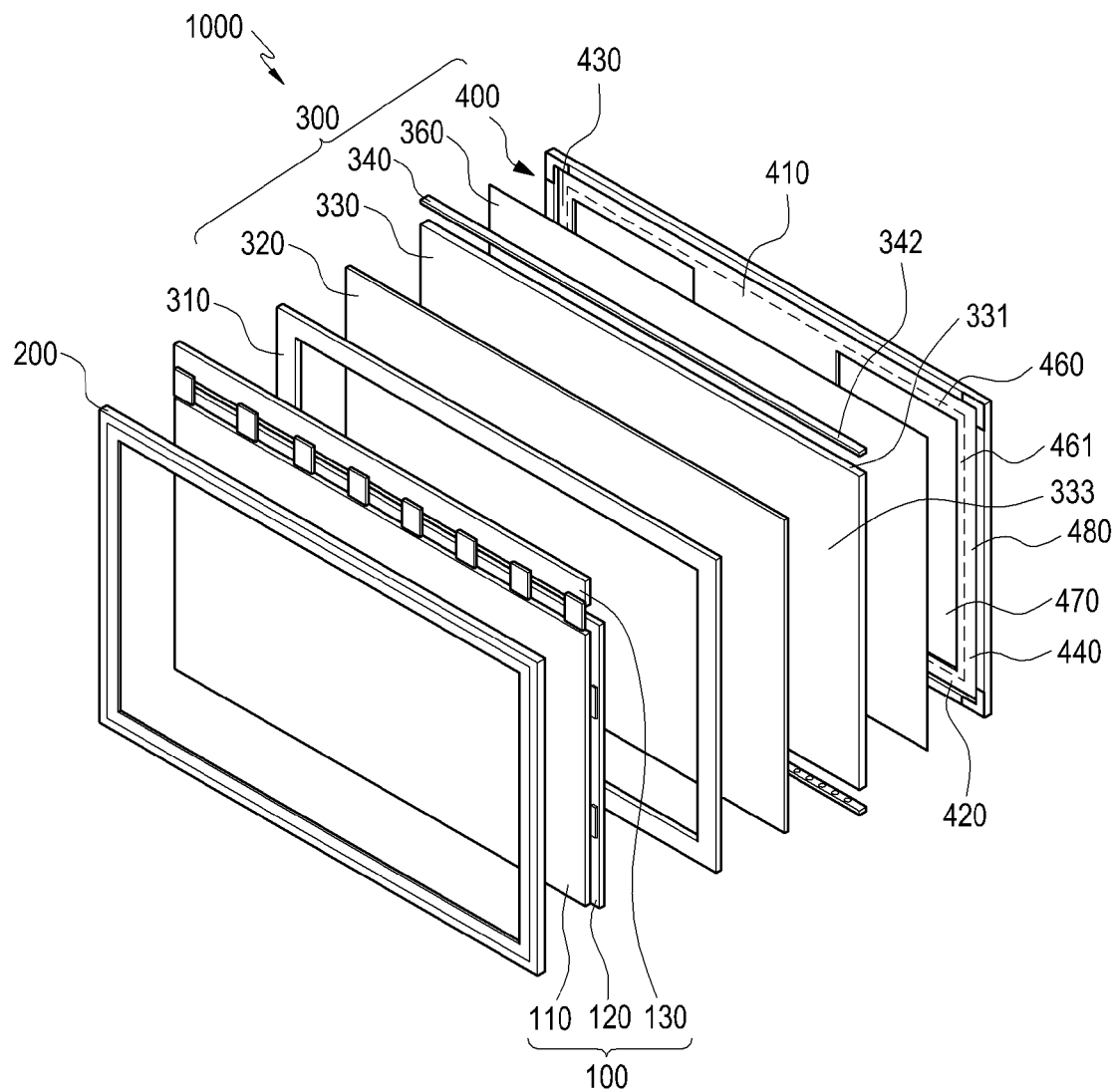
FIG. 1 is a perspective view of an exemplary embodiment of an exploded liquid crystal display ("LCD") module including a light guide plate ("LGP") support, according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the structure and manufacturing method thereof of the invention will be described in detail according to attached drawings and embodiments. It should be noted that even though the length and thickness of the apparatus and elements are expresses and their values are written, present invention is not limited to those values as long as they are not in the appended claims. It should be noted same numerical reference is used for the same element or apparatus throughout the drawings.

FIG. 1 is a perspective view of an exemplary embodiment of an exploded liquid crystal display ("LCD") module including a light guide plate ("LGP") support, according to the invention. Referring to FIG. 1, a LCD module 1000 has a liquid crystal ("LC") panel 100, a backlight assembly 300, and an upper cover 200. The LC panel 100 has a pair of substrates 110 and 120, a LC layer (not shown), and a LC panel driver 130. The LC panel 100 displays images with arrangements of LC molecules within the LC layer which are changed in response to a driving signal provided from an outer circuit element to the LC panel driver 130, and with control of passed light which is provided from the backlight assembly 300 to the LC layer.

The backlight assembly 300 generates and provides light to the LC panel 100. The backlight assembly 300 has a light source module 340, LGP 330 which receives light from the light source module 340 and provides light suitable to the LC panel 100, light controllers 320, and a LGP support 400 which supports and fixes the optical elements. The light source module 340 converts electrical energy to optical energy and may be a cold cathode fluorescent lamp ("CCFL"), a hot cathode fluorescent lamp ("HCFL") or a light emitting diode ("LED").

It will be well understood to one skilled in the art that the backlight assembly 300 of FIG. 1 is an edge type backlight assembly whose light source module 340 is positioned at an edge of the LCD module 1000. The light source module 340 of FIG. 1 is an LED assembly where a plurality of LEDs is mounted on a planar printed circuit board 342. Also, it is noted even though FIG. 1 only shows dual light source modules on opposing sides of the LGP 330, the LCD module 100 may include a single light source on one side of the LGP.

The light emitted from the light source module 340 enters into the LGP 330. The LGP 330 receives light through an incident surface 331, and emits light through an emitting surface 333 to the light controllers 320 and LC panel 100. On the rear side of the LGP 330, a reflector 360 is closely positioned directly adjacent to the LGP 330 to reflect light toward the LGP 330, and to reduce or effectively prevent optical loss within the backlight assembly 300. The light controller 320 is a collection of sheets each of which diffuses, scatters, and/or condenses light for alteration of a light path, and emits light to the LC panel 100 by controlling light received from the emitting surface 333 of the LGP 330.

An LGP support 400 of FIG. 1 has a plurality of LGP supporting pieces 410, 420, 430 and 440 when connected, collectively form a polygon. Each of the LGP supporting pieces 410, 420, 430 and 440 has an LGP supporting portion 460 including an LGP supporting surface 461 to support edges of the LGP 330, and a peripheral portion 480 outwardly extended from the LGP supporting surface 461 of the LGP supporting portion 460. Here, LGP supporting surfaces 461 of each LGP supporting pieces 410, 420, 430 and 440 in the connected polygon, lie substantially on the same plane.

The LGP supporting pieces 410, 420, 430 and 440 collectively form the closed polygonal LGP support 400 and an opening 470 in the middle thereof. The reflector 360 is placed below the LGP 330 on the LGP supporting surface 461, adjacent the opening 470. The reflector 360 is supported at its edges by the LGP supporting surfaces 461, and its middle portion is exposed to an outside of the backlight assembly 300 and the LCD module 1000 by the opening 470.

The LGP support 400 includes the LGP supporting surface 461 of the LGP supporting portion 460 at an upper surface of the LGP support 400, and a lower surface (not shown) opposing the upper surface of the LGP support 400. The lower surface of the LGP support 400 is also the lowermost surface of the backlight assembly 300. The lower surface of the LGP support 400 is not supported by other elements of the backlight assembly 300, and is exposed to the outside of the backlight assembly 300. Accordingly, the lower surface of the LGP support 400 is an important part which is exposed to the outside of the backlight assembly 300, together with the middle portion of the reflector 360.

Unlike the backlight assembly 300 of FIG. 1, a conventional backlight assembly has an LGP supporting member which supports both the LGP and the reflector in one hand, and is supported itself by a distinctive element, e.g., a closed bottom container, on the other hand. The LGP supporting member of the conventional backlight assembly has a surface which is parallel to the reflector, and an upright wall which is extended and bent from the parallel surface. The bottom container has a planar main portion, and a side wall portion which is extended and bent from the main portion. The main portion of the bottom container overlaps almost an entire area of the reflector and the LGP supporting member. The side wall of the bottom container is combined with the upright wall of the LGP supporting member. According to the aforesaid conventional structure, the bottom container is placed at the lowermost part of the backlight assembly. Accordingly, the backlight assembly of the conventional technology is heavy and bulky.

In contrast, an overall size and weight of the backlight assembly of the invention can be reduced, since the lower surface of the LGP support 400 and the middle portion of the reflector 360 are exposed to the outside of the backlight assembly 300 through the opening 470 defined by the LGP supporting pieces 410, 420, 430 and 440.

Figure 2:
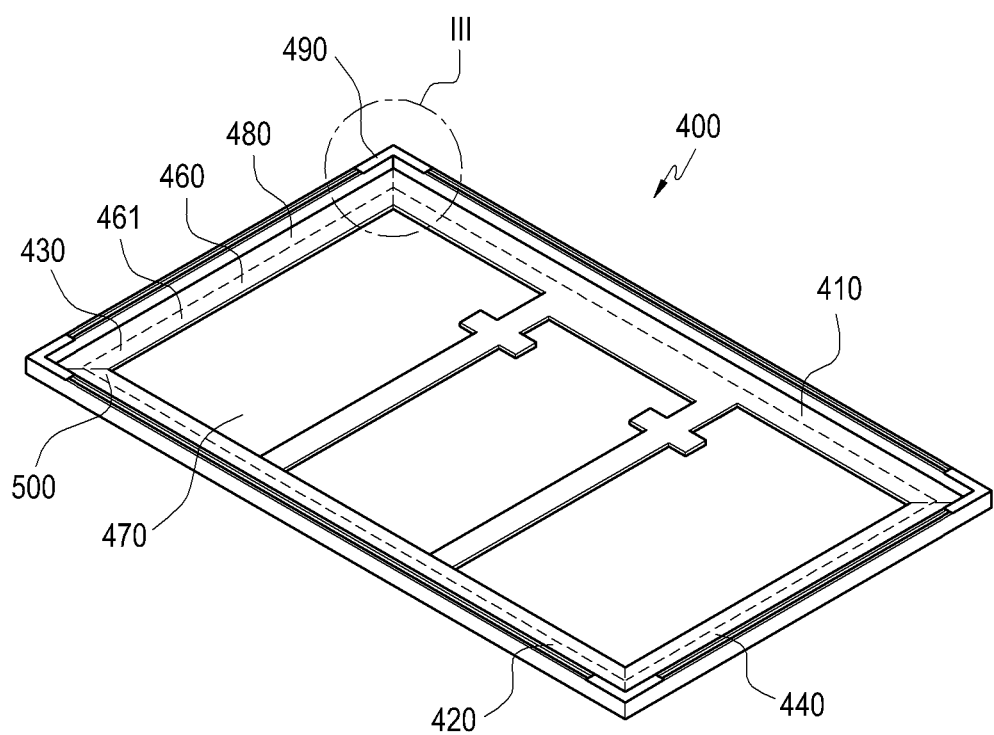
FIG. 2 is a perspective view of an exemplary embodiment of the LGP support including a plurality of an LGP supporting piece.

FIG. 2 is a perspective view of an exemplary embodiment of an LGP support including a plurality of the LGP supporting piece. Referring to FIG. 2, the LGP support 400 includes first through fourth LGP supporting pieces 410, 420, 430 and 440, each of which is elongated in a specific cross-section to be a longitudinal rod-like element. The LGP support 400 also has an opening 470 in the middle thereof. Each of the LGP supporting pieces 410, 420, 430 and 440 has a LGP supporting portion 460 which has a LGP supporting surface 461, and a peripheral portion 480 opposite to the opening 470 and extending from the LGP supporting surface 461.

The LGP supporting portion 460 supports the LGP 330 by overlapping the edges of the LGP 330, while the opening 470 overlaps the middle portion of the LGP 330. Here, the LGP supporting portion 460 and the LGP 330 remain overlapped as the LGP 330 is not slipped out from the LCD module 1000 when the LCD module 1000 expands and shrinks from sudden external impact or thermal impact. The peripheral portion 480 of the LGP supporting pieces 410, 420, 430 and 440 is outwardly extended from the LGP supporting portion 460, and may form an area for mounting the light source module 340 and/or an intermediate support 310 which are placed around the LGP 330. The LGP supporting portion 460 is between the opening 470 and the peripheral portion 480 as illustrated in FIG. 2.

Since the heat of the light source module 340 on the peripheral portion 480 should be dissipated from the backlight assembly 300 and the LCD module 1000 rapidly and effectively, the LGP supporting pieces 410, 420, 430 and 440 may include a metal material such as aluminum alloy, stainless steel, and steel electro galvanized cold-rolled coil ("SECC"). The LGP supporting pieces 410, 420, 430 and 440, including a metal material, may be manufactured by either a pressing method which presses metal plate to form a shape, or by an extruding method where liquid metal is extruded through specially designed nozzle.

The LGP supporting pieces 410, 420, 430 and 440 may be manufactured by the extruding method since a uniform cross-section over the entire piece is suitable for stable supporting and fixing of elements of the LCD module 1000 to the piece. Among the materials presented, aluminum alloy may be used for extruding method. Nonetheless, it should be noted that manufacturing method of the LGP supporting pieces 410, 420, 430 and 440 is not limited to the extruding method. Rather, the LGP supporting pieces 410, 420, 430 and 440 may be manufactured by any method and material as long as at least one element among the LGP 330, the reflector 360, and the light source module 340 is stably fixed to the respective LGP supporting piece 410, 420, 430 and 440.

The LGP support 400 of the illustrated exemplary embodiment of the invention may be adopted in large screen LCD modules which are used in large screen monitors, television sets, and digital information displays ("DIDs"). Exemplary diameters for the large screen LCD modules 1000 are 40 inch or 102 centimeter, 46 inch or 117 centimeter, 52 inch or 132 centimeter, or 57 inch or 145 centimeter. The transportation of the assembled LGP support 400 of the LCD module 1000 needs a wide space and is expensive where the rectangular LGP support 400, as shown in FIG. 2, is transported. Hence, the manufacturing process of the LCD module 1000 can be effective when each side of the polygon of the LGP support 400 and its end portions are transported without being assembled, and then finally assembled by the backlight assembly manufacturer or LCD module manufacturer.

Accordingly, the LGP support 400 of FIG. 2 is completed by joining the elongated longitudinal LGP supporting pieces 410, 420, 430 and 440 together.

The LGP supporting surface 461 of the LGP supporting portion 460 of one of the LGP supporting pieces 410, 420, 430 and 440 is connected and aligned with the supporting surface 461 of a directly adjacent LGP supporting piece, at the substantially same height of the one LGP supporting portion 460. After assembling, the adjacent LGP supporting surfaces 461 and the adjacent LGP supporting portions 460 of the adjacent LGP supporting pieces are substantially flat (e.g., coplanar) at an interconnecting portion 500.

To easily make the flat structure, a further connecting piece 490 may be used at corners formed by directly adjacent LGP supporting pieces. Each connecting piece 490 is fixed to both of the adjacent LGP supporting pieces, and the LGP supporting surfaces 461 of the adjacent LGP supporting pieces are in a flat plane when the adjacent LGP supporting pieces are assembled together. Namely, each of the LGP supporting surfaces 461 of the adjacent LGP supporting portions 460 lies substantially on the same plane.

Figure 3:
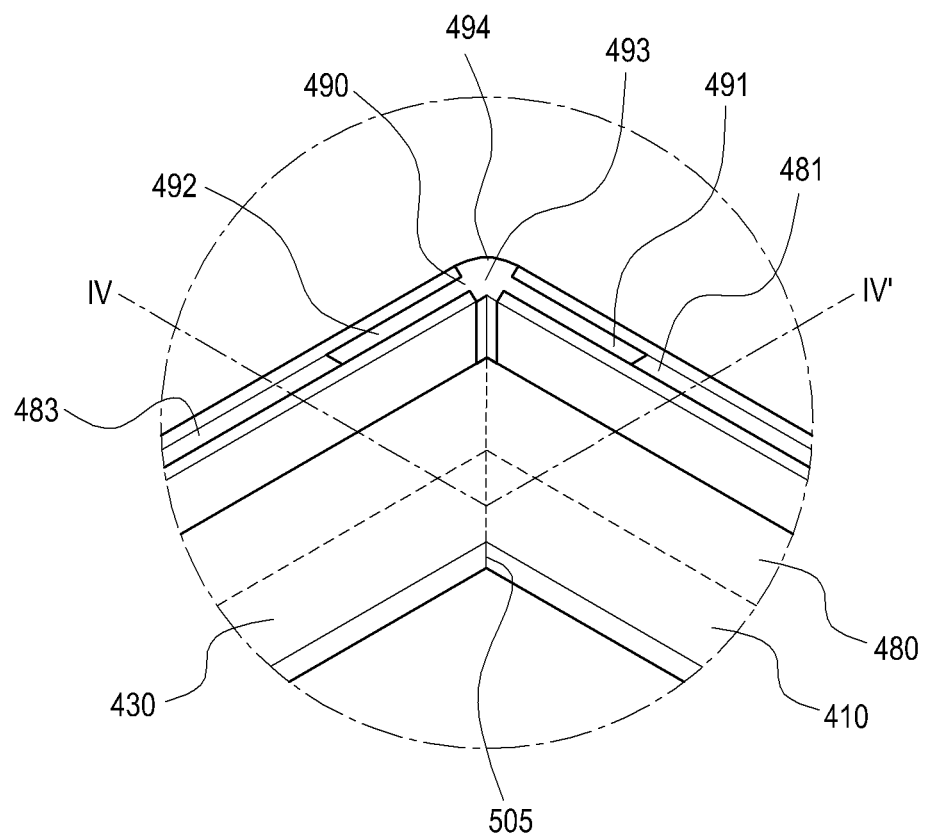
FIG. 3 is an enlarged perspective view of portion III of FIG. 2, depicting an interconnecting portion including a connecting piece which connects adjacent LGP supporting pieces.

FIG. 3 is an enlarged perspective view of portion III of FIG. 2, depicting an interconnecting portion including a connecting piece which connects adjacent LGP supporting pieces. Referring to FIG. 3, the connection piece 490 is bent to have a first anchor 491 which overlaps the first LGP supporting piece 410, and a second anchor 492 which overlaps the third LGP supporting piece 430. The first and second anchors 491 and 492 are respectively connected to a first connection piece reception portion 481, and a second connection piece reception portion 483 which are near (e.g., adjacent to) the peripheral portions 480 of the LGP supporting pieces 410 and 430. The connection piece reception portions 481 and 483 are channels having internal space.

The connection piece reception portions 481 and 483 are channels having internal spaces. The anchors 491 and 492 are inserted and fixed to the internal spaces of the connection piece reception portions 481 and 483 to make the interconnection of adjacent LGP supporting pieces stable. Although the channel of the connection piece reception portions 481 and 483 in FIG. 3 is depicted to be extended through an entire length of the LGP supporting piece 410 and 430, the channel may be extended only a partial length of the LGP supporting piece 410 and 430, such as only at a part where the connection piece 490 is engaged, while a remaining portion of the LGP supporting piece 410 and 430 has no channels.

Referring to FIG. 3, the connection piece reception portions 481 and 483 are formed between walls of the peripheral portion 480 which extend from a base portion of the peripheral portion 480. The connection piece 490 is placed at an outer area of the interconnecting portion 500, which is a corner of the LGP support 400, so the connection of the adjacent LGP supporting pieces is easy. The connection piece 490 is provided with the anchors 491 and 492 extending in different directions to each other and from an annexed portion 493 of the connecting piece 490. The anchors 491 and 492 and the annexed portion 493 may collective form a single unitary and indivisible connecting piece 490.

When the anchors 491 and 492 are placed at a border between the adjacent LGP supporting pieces 410 and 430, the annexed portion 493 is placed at an outer part of the interconnecting portion 500 to have a outside exposure portion 494 where the connection piece 490 is exposed to an outside of the LGP support 400. With the outside exposure portion 494, the connection piece 490 is located between the two adjacent LGP supporting pieces 410 and 430, and the walls of the peripheral portion 480. Further, the adjacent LGP supporting pieces 410 and 430 may be connected to each other by contacting and processing side surfaces of the adjacent LGP supporting pieces 410 and 430 to make a jointing portion 505. The contacted side surfaces of the adjacent LGP supporting pieces 410 and 430 are denoted as a dotted line.

Figure 4:
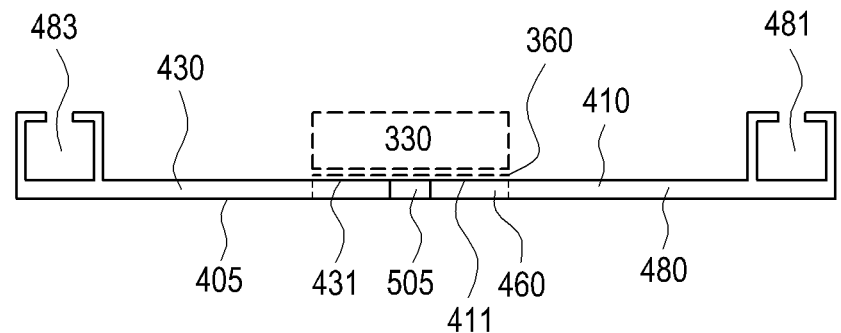
FIG. 4 is a cross-sectional view of the interconnecting portion cut along line IV-IV' of FIG. 3, showing the interconnecting portion formed by adjoining side surfaces of the LGP supporting pieces.

FIG. 4 is a cross-sectional view of the interconnecting portion 500 cut along line IV-IV' of FIG. 3, where the interconnecting portion 500 is formed by adjoining side surfaces of the LGP supporting pieces 410 and 430. The first LGP supporting piece 410 and the third supporting piece 430 of FIG. 4 are welded together by a well known friction stir welding ("FSW") technology.

FSW technology is a welding technology using melted metal plates whose welding points are sequentially contacted and melted together by a rotary power of the welding machine. Therefore, welded metal plates may be arranged substantially on the same plane and the thickness of the welded product is not increased. In FIG. 4, the melted point softened by rotary power is jointing portion 505 where the materials of each of the adjacent LGP supporting pieces 410 and 430 are mixed together. The jointing portion 505 may be defined as an area of metal welding. It should be noted that although the jointing portion 505 is shown with dotted line in FIG. 3, the jointing by the FSW technology can be expressed as a planar area of metal welding.

The first LGP supporting piece 410 and the third LGP supporting piece 430 are connected at the jointing portion 505 by welding technology, and the LGP supporting surfaces 411 and 431, e.g., upper surfaces of the LGP supporting portions 460, are substantially on the same plane. Accordingly, the LGP 330 and the reflector 360 can be stably placed in the backlight assembly 300, on a continuous coplanar upper surface of the LGP supporting portions 460.

On an opposite side of the connected LGP supporting surfaces 411 and 431, a back surface 405 of the LGP supporting portion 460 is formed. Aforesaid, although it is described that adjacent LGP supporting pieces 410 and 430 are joined with FSW technology, one of ordinary skill in the art may easily understand that other welding technology and assembling methods can be used for joining adjacent LGP supporting pieces including LGP supporting surfaces 461 on a substantially same plane, without departing from the spirit and scope of the invention.

Figure 5:
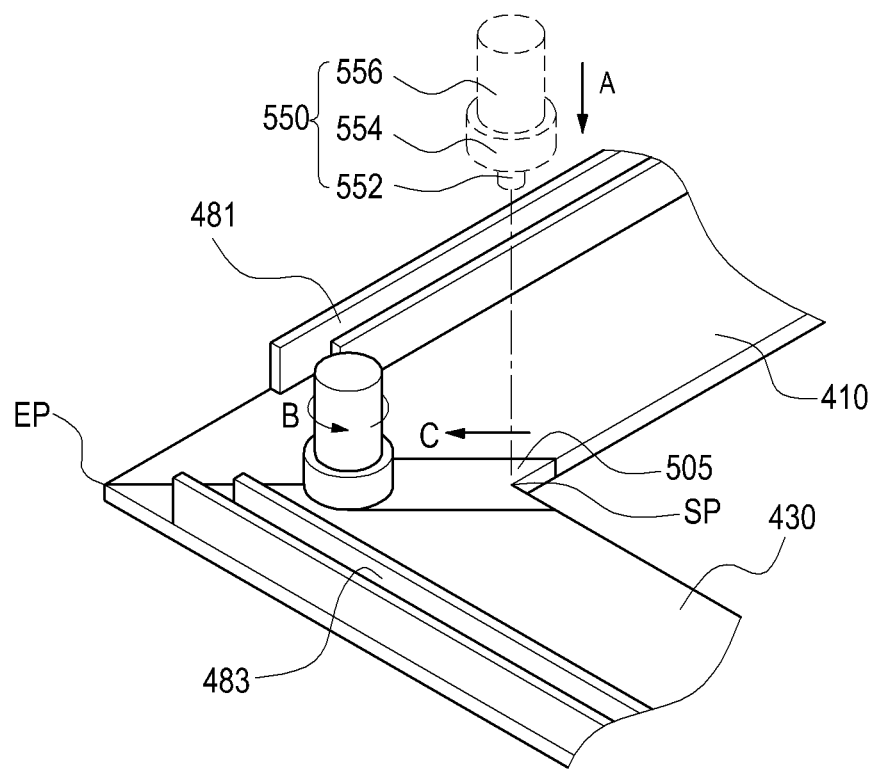
FIG. 5 is a view showing an exemplary embodiment of a method of joining LGP supporting portions by friction stir welding ("FSW") technology.

FIG. 5 is a view showing an exemplary embodiment of a method of joining the LGP supporting portions by FSW technology. According to FIG. 5, a pressurized rotator 550, used as a welding machine, has a probe 552 rotated after being inserted into a metal plate, a shoulder 554 rotated while being in close contact with the surface of the metal plate, a grip 556 connecting a driving part (not shown) of the pressurized rotator 550 and the shoulder 554. The pressurized rotator 550 is sequentially moved down in a direction of A, rotated in a direction of B, and moved in a direction of C, from a starting point of contacting the first and third LGP supporting pieces 410 and 430. The pressurized rotator 550 causes frictional heat by the rotation with the LGP supporting pieces 410 and 430, and the adjacent LGP supporting pieces 410 and 430 are welded together by mixing the melted material of the LGP supporting pieces 410 and 430 at the jointing point 505 at which a temperature is higher than the melting point of the material of the LGP supporting pieces 410 and 430.

The pressurized rotator 550 goes forward from a starting point SP to an end point EP while the precise welding is made without any interruption by other structures on the LGP supporting pieces 410 and 430. In other words, as shown in FIG. 5, terminal parts (e.g., distal ends) of the walls are spaced apart with respect to the jointing portion 505, such that the terminal parts of the walls are not in contact with the pressurized rotator 550 during the welding process. Here, the terminal parts of the walls may form the connecting piece reception portions 481 and 483. Accordingly, if the starting point SP and the ending point EP are distant from the terminal portions of the walls of the peripheral portion 480, there will be empty space between two connection piece reception portions 481 and 483 on which the connection piece of FIG. 3 and/or an intermediate support, explained later, are placed.

Unlike the process of FIG. 5 where the connection piece 490 is combined with the LGP supporting pieces 410 and 430 after the LGP supporting pieces 410 and 430 are themselves joined, in an alternative exemplary embodiment, a process of combining the connecting piece 490 and the LGP supporting pieces 410 and 430 is performed earlier, and the connection process of the LGP supporting pieces 410 and 430 is performed later.

Figure 6:
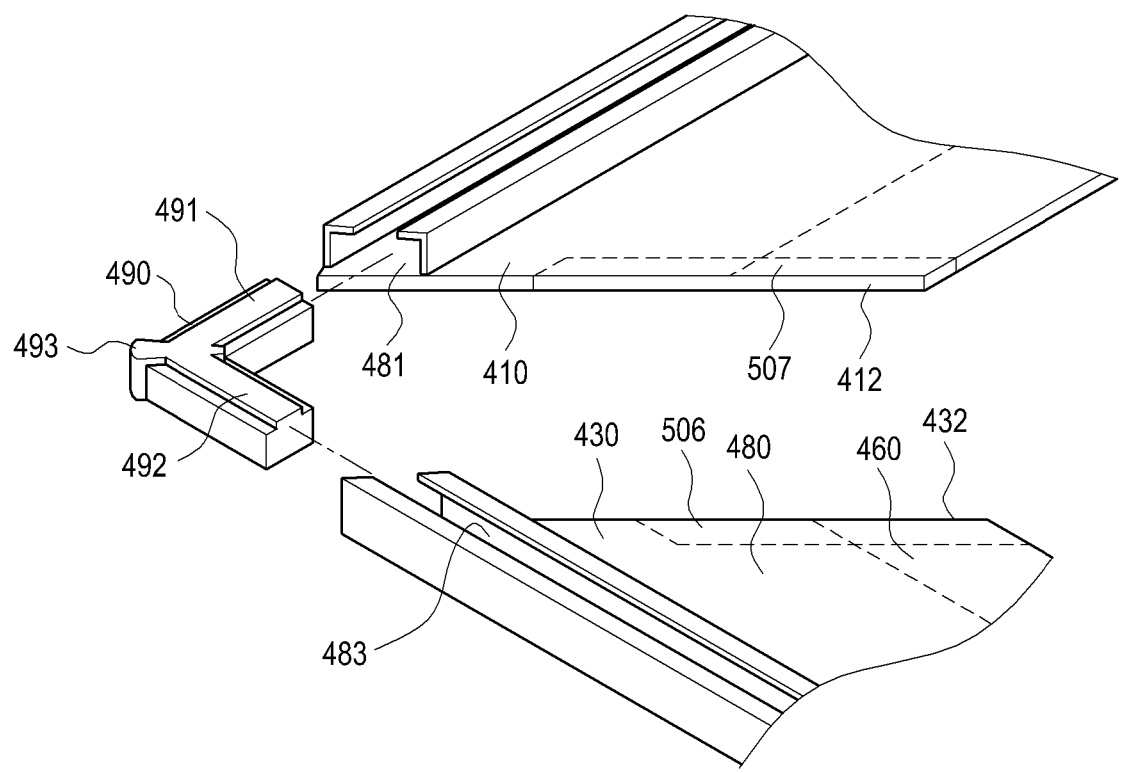
FIG. 6 is a perspective view of an exemplary embodiment of an exploded interconnecting portion, showing the structure of adjacent LGP supporting pieces and the connecting piece, which are connected by FSW technology.

FIG. 6 is a perspective view of an exemplary embodiment of an exploded interconnecting portion 500, showing the adjacent LGP supporting pieces 410 and 430 and the connection piece 490 which are connected by FSW technology. The anchors 491 and 492 of the connecting piece 490 are inserted into the connection piece reception portions 481 and 483 of the LGP supporting pieces 410 and 430. During the insertion process, if a first side surface 412 of the first LGP supporting piece 410 and a third side surface 432 of the third LGP supporting piece 430 are contacting each other, then the FSW process is eased. Even though not shown, the contacting of the first and third side surfaces 412 and 432 may be made with an extra jig, which maintains the contact between the first and third side surfaces 412 and 432 during the FSW process.

Jointing areas 506 and 507 are respectively defined on each of the LGP supporting pieces 410 and 430, and are combined by close contact and a subsequent FSW process. The jointing areas 506 and 507 are each respectively elongated parallel to the first and third side surfaces 412 and 432, and extend from the LGP supporting portion 460 to the peripheral portion 480. However, the elongation of the jointing areas 506 and 507 may not reach to the connection piece reception portions 481 and 483 of the peripheral portion 480. In this case, the connection piece reception portions 481 and 483 fix areas of the LGP supporting pieces 410 and 430, other than the jointing portion 505 of the LGP supporting pieces 410 and 430.

The connection piece 490 is combined with the connection piece reception portions 481 and 483 through the first and second anchors 491 and 492. The connecting piece 490 also has the annexed portion 493 which may be placed at a corner formed by the adjacent LGP supporting pieces 410 and 430, while being exposed to the outside of the LGP support 400. Since the four exposed corners of the LGP support 400 experience more external shock than other parts of the LGP support 400, it is desired that the connecting piece 490 has a higher hardness than a hardness of remaining elements of the LGP support 400. Therefore, where the connecting piece 490 at the corners of the LGP support 400 has the higher hardness, the whole backlight assembly 300 and the LCD module 1000 is protected. However, the material of the connecting piece 490 is not limited to a high hardness material. Rather, the connecting piece 490 may include a high elasticity material which absorbs a shock to the LGP support 400 from the outside of the LGP support 400.

The LCD device of the invention may be large screen monitor, television, or DID which displays special information on the street or in public places. To manufacture and assemble the large screen effectively, as shown and explained with the structure of FIG. 2, making the LGP support 400 with relatively long and straightly elongated LGP supporting pieces 410, 420, 430 and 440 is good for accommodating low material cost and ease of transformation of the individual and/or assembled parts.

Also, even though not depicted in FIG. 6, at least one peripheral portion 480 of the LGP supporting pieces 410 and 430 has the light source module 340 mounted thereon, which provides light to the LGP 330. Since the light source module 340 functions as a heat source as the light source module 340 converts the electricity to light, the LGP supporting pieces 410, 420, 430 and 440 may include a metal to be an effective heat sink. The aforesaid metal elongated LGP supporting pieces 410, 420, 430 and 440 are made by various processes such as by a pressing process, a punching process, or an extruding process.

Each LGP supporting piece 410 and 430 of FIG. 6 may be manufactured by the extruding process, where a certain shape of nozzle extrudes aluminum alloy to make the LGP supporting pieces 410 and 430 have predetermined constant shape. In one exemplary embodiment, for example, aluminum alloy may contain magnesium or zinc, and the melting point of these materials ranges from about 475 degrees centigrade to about 650 degrees centigrade.

The extruded LGP supporting piece 410 and 430 may be cut in accordance to the shape and location of the first and third side surfaces 412 and 432. In one exemplary embodiment, for example, by an oblique cutting of the first and third side surfaces 412 and 432 of FIG. 6, the LGP supporting pieces 410 and 430 are combined at a right angle at the corner of the LGP support 400. The extruded and cut LGP supporting pieces 410 and 430 are combined with each other at the jointing portion 505, since the melting point of the LGP supporting pieces 410 and 430 is lower than the melting point of the alloy steel of the pressurized rotator 550.

The LGP supporting pieces 410, 420, 430 and 440 of the invention are interconnected by any of the methods described above, including FSW technology, and the LGP supporting surfaces 411, 431 and 461 of the connected LGP supporting pieces 410, 420, 430 and 440 are aligned substantially at the same plane whatever the combining method is used. To place the LGP supporting portions 411, 431 and 461 substantially on the same plane, the side surfaces of adjacent LGP supporting pieces may be connected with various methods. Here, the side surface is a terminal cross-section of the elongated longitudinal LGP supporting piece. Thus, as explained with FIG. 6, the side surface of one LGP supporting piece is the part which faces and is connected to the cross-section of the adjacent LGP supporting piece.

In one exemplary embodiment, for example, the side surfaces of the adjacent LGP supporting pieces may be connected while they are directly contacting each other, as shown in FIG. 3 to FIG. 5. In an alternative exemplary embodiment, the side surfaces face each other and are spaced apart with a connecting piece in between. The connecting piece may have various shapes and be fixed to the LGP supporting pieces 410, 420, 430 and 440 at different locations.

FIGS. 7A through 7F are each plane views showing exemplary embodiments of various connecting structures between adjacent LGP supporting pieces and various shapes and locations of the connection pieces according to the invention. For convenience sake, it should be noted that connection piece reception portions 481 and 483 on the LGP supporting pieces 410, 420, 430 and 440 are omitted from each plane view.

Figure 7A:
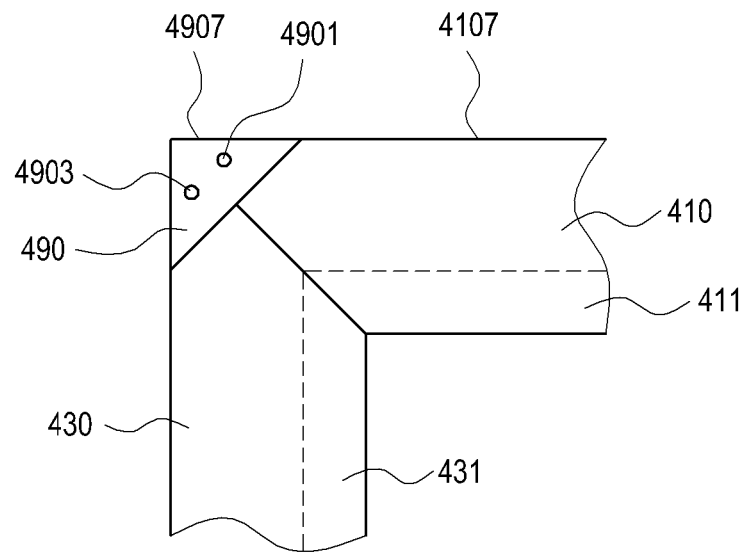
FIGS. 7A through 7F are plane views showing exemplary embodiments of various connecting structures between adjacent LGP supporting pieces and various shapes and locations of the connecting pieces, according to the invention.

FIG. 7A is a plane view showing a connecting structure where the first and third LGP supporting pieces 410 and 430 are connected by the connection piece 490. Unlike FIG. 6, the first and third LGP supporting pieces 410 and 430 are connected without a FSW process while they are respectively connected to the connection piece 490. The connection piece 490 may be located directly on either the LGP supporting surfaces 411 and 431, or directly on the opposite surface (e.g., the back surface 405) of the LGP supporting surfaces 411 and 431. The connection piece 490 is combined with joining points 4901 and 4903, each of which are on the respective LGP supporting pieces 410 and 430, and combine the adjacent LGP supporting pieces 410 and 430 together.

The joining points 4901 and 4903 are formed by TOX® technology made by TOX PRESSOTECHNIK L.L.C.) or a welding method. The TOX® technology is one kind of punching technology performed by overlapping the connection piece 490 and the adjacent LGP supporting pieces 410 and 430, and subsequently impacting on the joining points 4901 and 4903 to deform one of the connection piece 490 and the adjacent LGP supporting pieces 410 and 430, and join the pieces together. The welding method includes welding the connection piece 490 and holes prepared at the spot of the joining points 4901 and 4903 of the connection piece 490 together.

The first side surface 412 which is directly extended and bent from the first LGP supporting surface 411 of the first LGP supporting piece 410 meets the third side surface 432 which is directly extended and bent from the third LGP supporting surface 431 of the third LGP supporting piece 430. That is, the first and third side surfaces 412 and 432 directly contact each other. The first LGP supporting surface 411 and the third LGP supporting surface 431 lie on the substantially same plane to support the LGP 330 and the reflector 360 stably. It should be noted that throughout following FIGS. 7B to 7F, the LGP supporting surfaces 411, 431 and 461 of adjacent LGP supporting pieces lie on the substantially same plane to support the LGP 330 and the reflector 460 stably.

In FIG. 7A, outermost sides 4907 of the connection piece 490 are placed to correspond to (e.g., are aligned with) a corner line of the LGP supporting pieces 410 and 430. The outermost sides 4907 of the connection piece 490 are exposed to the outside of the LGP support 400 when the connection piece 490 is connected to the respective first and third adjacent LGP supporting pieces 410 and 430. Specifically, the outermost sides 4907 of the connection piece 490 may be on or extended from a virtual extended line of an outer side 4107 of the first and third LGP supporting pieces 410 and 430, to have the connection piece 490 easily absorb external shock given to the LGP support 400. Where the outermost sides 4907 of the connection piece 490 are on the virtual extended line of the outer side 4107 of the first and third LGP supporting pieces 410 and 430, the arrangement of the LGP supporting pieces 410 and 430 and the connection piece 490 is accommodated.

Figure 7B:
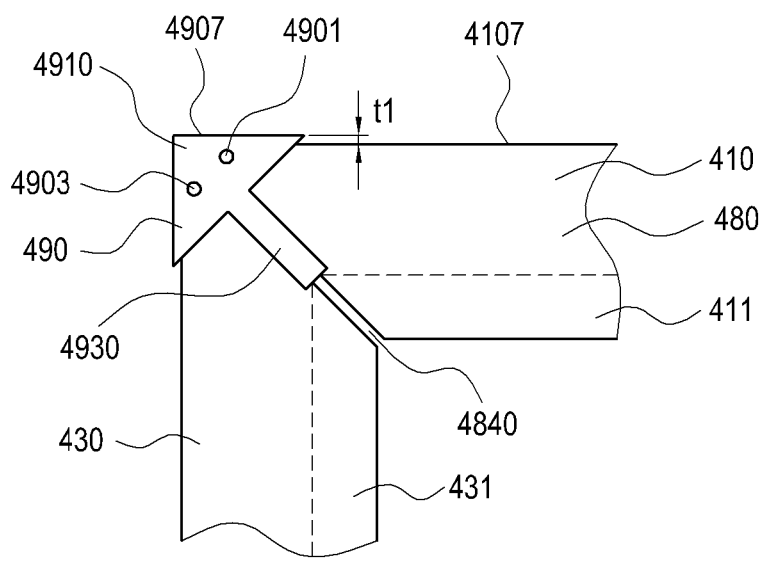

FIG. 7B is a plane view showing connecting structure where the first and third LGP supporting pieces 410 and 430 are spaced apart from each other at the interconnecting portion 500, but connected to each other by the connection piece 490, unlike FIG. 7A. A separation space 4840 is defined between the first and third LGP supporting pieces 410 and 430, and reduces distortion of the LGP support 400 that may be caused by heat of the light source module 340 (not shown) that induces extension of the LGP supporting pieces 410, 420, 430 and 440.

In one exemplary embodiment, for example, if the light source module 340 is fixed on the third LGP supporting piece 430, the heat of the light source module 340 may cause the third LGP supporting piece 430 to be deformed and extended towards the first LGP supporting piece 410, such that the third LGP supporting piece 430 rises up and collides with the first LGP supporting piece 410. The separation space 4840 prohibits the rising phenomenon, functions as a tolerance caused by combining different parts, and is adopted for enlarging designing flexibility when standard parts are employed to the LCD module 1000.

The separation space 4840 may be covered (e.g., overlapped) by reflector 360 which is placed on the LGP supporting surfaces 411, 431 and 461 to reduce or effectively prevent leaking light from the LGP 330 and/or the light source module 340. A space not overlapped by the reflector 360 and continuous with the separation space 4840, that is included in the peripheral portion 480 of the LGP support 400, may be between the adjacent first and third LGP supporting pieces 410 and 430. Alternatively, as shown in FIG. 7B, the space included in the peripheral portion 480 and continuous with the separation space 4840 may be blocked (e.g., overlapped) by the connecting piece 490 to screen the light from leaking to outside of the LGP 330 and/or the light source module 1000.

As shown in FIG. 7B, the connection piece 490 may have protruding portion 4930 that screens (e.g., overlaps) a portion of the separation space 4840 which includes the space in the peripheral portion 480 which is continuous with the separation space 4840. The connection piece 490 has a fixing portion 4910 that is connected to the protruding portion 4930. The fixing portion has the joining points 4901 and 4903 which are the basis of interconnection between the connection piece 490 and the adjacent LGP supporting pieces 410 and 430. The fixing method of the connection piece 490 and the adjacent LGP supporting pieces 410 and 430 at the joining points 4901 and 4903 are similar to the methods explained in FIG. 7A. The fixing portion 4910 of the connection piece 490 is placed on (e.g., overlapping) the adjacent LGP supporting pieces 410 and 430, and includes outermost sides 4907.

Unlike FIG. 7A, the outermost sides 4907 of the connection piece can be extended by a distance t1 from the outer side 4107 of the LGP supporting pieces 410 and 430. The distance t1 may be used for accommodating another part of the LCD module 1000, such as an upper cover 200 (not shown) whose vertical side is combined with the LGP support 400 and is as thick as the distance t1. The outermost sides 4907 of the connection piece 490 are spaced apart from the LGP supporting pieces 410 and 430 by the distance t1. As disclosed, if the outermost sides 4907 of the connection piece 490 are outwardly extended from the outer side 4107 of the LGP supporting pieces 410 and 430, the outermost sides 4907 of the connection piece 490 become an outermost side of the LCD module 1000 to enhance the shock resistance and compactness of the backlight assembly 300 and the LCD module 1000.

Figure 7C:
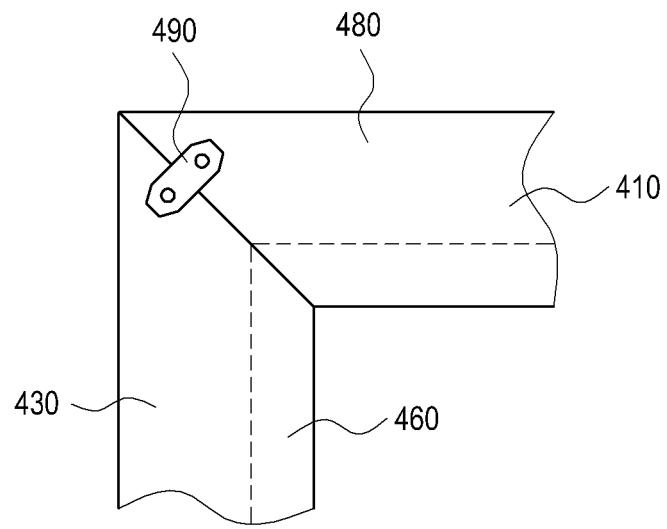

FIG. 7C is a plane view showing the connecting structure where the connection piece 490 is located roughly in a middle of the peripheral portion 480 of the LGP support 400. Specifically, connection piece 490 extends to (e.g., overlaps with) both of the adjacent LGP supporting pieces 410 and 430, but does not extend to the corner of the LGP support 400. Accordingly, the space between the connection piece 490 and corner of the LGP support 400 can accommodate another part of the backlight assembly 300. In one embodiment, for example, a light source module 340 is placed in a portion of the space between the connection piece 490 and corner of the LGP support 400, to make the backlight assembly 300 compact. The connection piece 490 can be combined with the LGP supporting pieces 410 and 430 as described with respect to FIG. 7A and FIG. 7B.

Figure 7D:
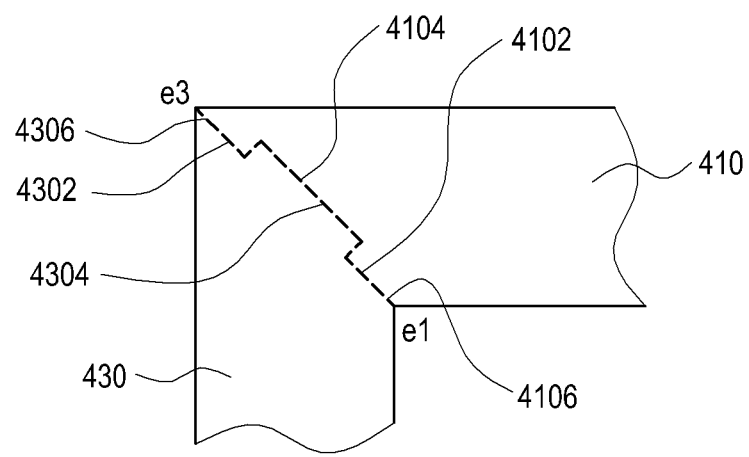
Figure 7E:
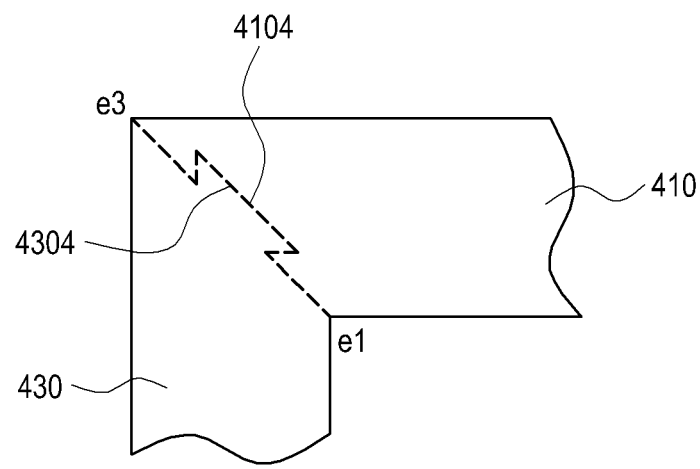

FIG. 7D and FIG. 7E are plane views of connecting structures showing profiles of the side surfaces of the adjacent LGP supporting pieces 410 and 430. In each of FIGS. 7A to 7F, the directly contacting side surfaces of the adjacent LGP supporting pieces may be fixedly connected by various methods, including the FSW process. There may be other exemplary embodiments of combining adjacent LGP supporting pieces without the help of connection piece 490, while placing the LGP supporting surfaces 411, 431 and 461 of the LGP supporting pieces 410 and 430 substantially on the same plane.

Referring to FIG. 7D, a middle part of a third side surface 4302 of the third LGP supporting piece 430 includes a convex portion 4304 which is combined with a concave portion 4104 in a middle part of a first side surface 4102 of the first LGP supporting piece 410. Even though the illustrated exemplary embodiment of the convex portion 4304 and the concave portion 4104 extend perpendicular to a virtual reference line which includes the reference lines 4106 and 4306, and which connects the end points e1 and e3, the convex portion 4304 and the concave portion 4104 may make either obtuse or acute angles with the reference lines 4106 and 4306, as shown with FIG. 7E.

Figure 7F:
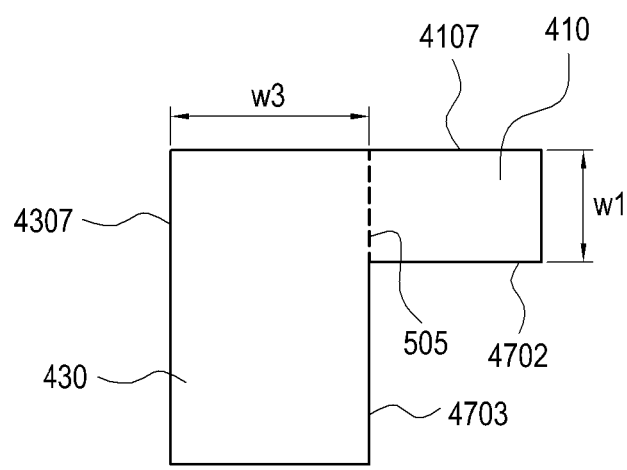

The terminal portion of each of the adjacent LGP supporting pieces 410 and 430 may be square, as disclosed in FIG. 7F. Referring to FIG. 7F, the first and third LGP supporting pieces 410 and 430 include the square terminal portions which have right angles at the terminal portions. In a case where the LGP supporting pieces 410, 420, 430 and 440 are manufactured in an extruding method, since the extruding method uses a constantly shaped nozzle throughout the process, cutting of the terminal portion of the square LGP supporting piece after the extruding process is not necessary. In contrast, for example, the exemplary embodiment of the aforesaid LGP supporting pieces 410 and 430 in FIG. 7C having obtuse or acute angles on their terminal portions, requires the angles be made by cutting the piece in oblique manner after the extruding process, while the manufacturing process of the LGP supporting piece of FIG. 7F does not need the oblique cutting process after the extruding process.

Respective LGP supporting pieces may have different widths. In FIG. 7F, a width w1 of the first LGP supporting piece 410 is smaller than a width w3 of the third LGP supporting piece 430, the widths taken perpendicular to a longitudinal direction of the respective LGP supporting piece. Specifically, the width w1 may be defined as the distance between the first opening side 4702, where the opening 470 and the LGP supporting portion 460 of the first LGP supporting piece 410 meets, and the outer side 4107 of the peripheral portion 480. Alternatively, the width w1 may be a length of the terminal portion of the jointing portion 505, where the first LGP supporting piece 410 meets the third LGP supporting piece 430.

The width w3 of the third LGP supporting piece may be the distance from the jointing portion 505 to the corresponding part of an outermost side 4307 of the third LGP supporting piece 430. Alternatively, the width w3 may be the distance from the third opening side 4703, where the opening 470 and the LGP supporting portion 460 of the third LGP supporting piece 430 meets, to a third outermost side 4307 of the peripheral portion 480. Referring to FIG. 7F, the width w3 is larger than the width w1, and is therefore better for heat transmission or dissipation. Accordingly, when the light source module 340 is selectively mounted on a LGP supporting piece, the light source module 340 may be disposed on the wider third LGP supporting piece 430.

Figure 8A:
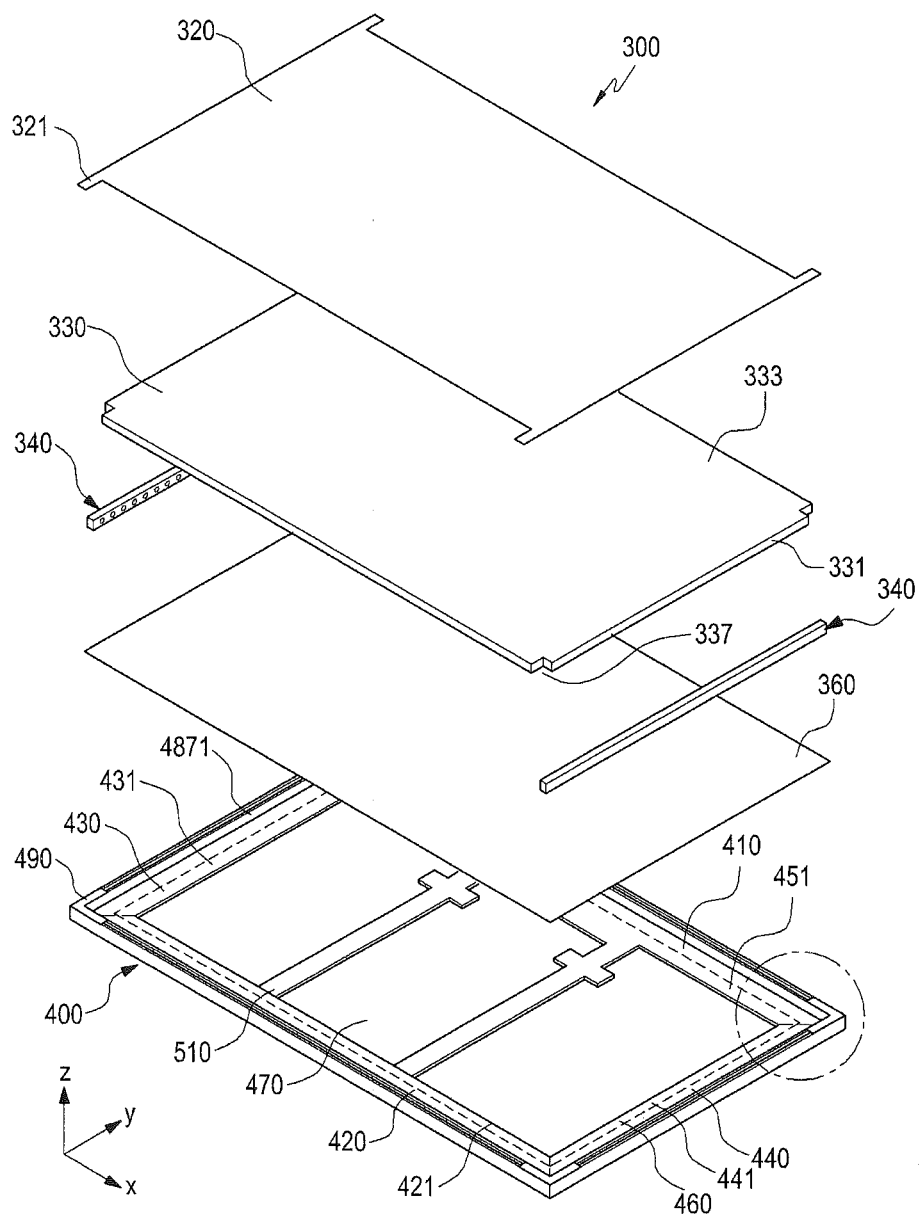
FIG. 8A and FIG. 8B are respectively an exploded perspective and an enlarged view of an exemplary embodiment of a backlight assembly including a connecting piece for joining adjacent LGP supporting pieces.
Figure 8B:
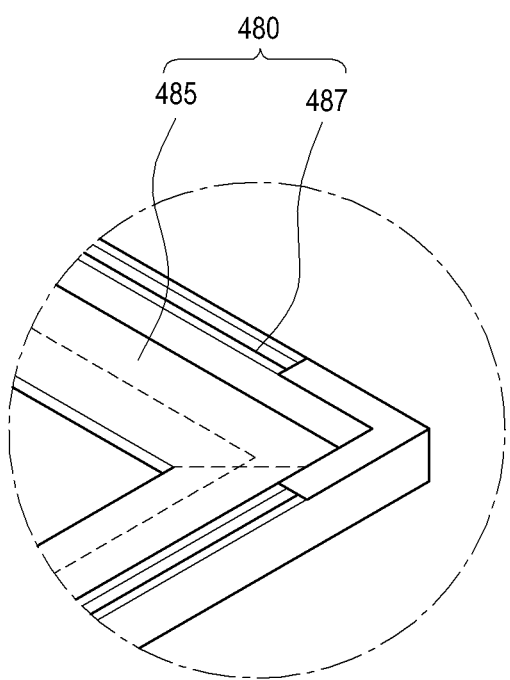

FIG. 8A and FIG. 8B are respectively a perspective and an enlarged view of an exemplary embodiment of a backlight assembly including a connection piece for joining adjacent LGP supporting pieces. Referring to FIG. 8A, the LGP support 400, whose respective adjacent LGP supporting pieces 410, 420, 430 and 440 are connected by connection pieces 490, is disposed at a lower part of the backlight assembly 300. The LGP supporting pieces 410, 420, 430 and 440 have elongated longitudinal stick shapes, and the LGP support 400 has a plurality of an opening 470 in the middle thereof.

The collective stick shaped LGP supporting pieces 410, 420, 430 and 440 have the LGP supporting portions 460, on which the LGP 330 is disposed directly on upper LGP supporting surfaces 421, 431, 441 and 451, and have the peripheral portions 480 outwardly extended from the LGP supporting portions 460. The LGP supporting surfaces 421, 431, 441 and 451 of the LGP support 400 are extended in parallel along the xy plane, support the LGP 330 and the reflector 360, and thus are substantially on the same plane, respectively.

Referring to FIG. 8B, the collective peripheral portion 480 is divided into first peripheral portions 485 and second peripheral portions 487. The first peripheral portions 485 are longitudinally extended in parallel with the LGP supporting portion 460, while the second peripheral portions 487 are extended outwardly from the first peripheral portions 485 in a parallel direction with the plane of the first peripheral portions 485. Each second peripheral portion 487 has a mounting wall 4871, and the connection piece reception portion 481 formed between the mounting walls 4871. The mounting wall 4871 includes an inner wall and an outer wall, both of which are vertically extended from the first peripheral portion 485, that is, in the z direction. The connection piece reception portion 481 is the channel formed by the inner wall and the outer wall. On at least one of the inner walls, the light source module 340 is mounted.

According to FIG. 8A, the LGP support 400 includes four longitudinally extending LGP supporting pieces 410, 420, 430 and 440. Each of the LGP supporting pieces 410, 420, 430 and 440 has the LGP supporting portion 460, the first peripheral portion 485 extended in parallel from the LGP supporting portion 460, and the second peripheral portion 487 vertically extended from the first peripheral portion 485. The light source modules 340 may be mounted on an inside of the inner walls at the second peripheral portions 487 of the third and fourth LGP supporting pieces 430 and 440.

The light source modules 340 emit light by receiving electric signals. The emitted light is incident to the LGP 330 through the incident surface 331 of the LGP 330, and is then reflected and/or scattered by optical patterns on both a bottom surface of the LGP 330 and the reflector 360. Thus, the light distribution within the LGP 330 is controlled, and light is emitted through the emitting surface 333 of the LGP 330. The light emitted in the z direction from the LGP 330 travels to the light controller 320, located on the LGP 330 at a viewing side of the LCD module 1000, and is finally emitted from the backlight assembly 300.

Edges of the reflector 360 are supported by LGP supporting surfaces 421, 431, 441 and 451 of the LGP support 400, while a remainder of the reflector 360 is exposed through the openings 470 of the LGP support 400 to the outside of the backlight assembly 300. For making a thin backlight assembly 300, the reflector 360 is made as thin as possible so long as sufficient reflectivity is maintained. On the other hand, the reflector 360 is only as thick as necessary to be in contact with the LGP 330, and to reduce or effectively prevent curling, since the reflector 360 is supported only by the LGP supporting portion 460 while its wide middle part is exposed by the opening 470. Thus, the reflector 360 of FIG. 8A may be a polyethyleneterephthalate ("PET") film with a thickness of about 0.4 millimeter (mm) As the LGP supporting portion 460 gets wider in a direction perpendicular to the longitudinal direction of the LGP supporting pieces 410, 420, 430 and 440, the exposed area and the thickness of the reflector 360 can be reduced.

Edges, or a frame area, of the LGP 330 are also supported by LGP supporting surfaces 421, 431, 441 and 451. Here, the reflector 360 is interposed between the edges of the LGP 330 and the LGP supporting portion 460, and the optical efficiency of the backlight assembly 300 is enhanced. The LGP 330 includes transparent material such as polymethylmethacrylate ("PMMA"), and may be manufactured by an extraction or an extruding method. The LGP 330 of FIG. 8A has a substantially plate shape. A height of the incident surface 333, that is, a thickness of the LGP 330 in the z direction, is substantially the same or a little less than a height of the light source module 340, to receive light from the light source module 340 effectively. Also, LGP 330 is thicker than the reflector 360 in the z direction.

In one exemplary embodiment, for example, the LGP 330 of FIG. 8A is produced by the extruding method to be as thick as 2.0 mm. Since edges of the LGP 330 are supported by the LGP supporting portion 460, a total area of the LGP supporting surfaces 421, 431, 441 and 451 (461 in FIG. 2) is designed to suppress the distortion (e.g., bending or curving) phenomenon of the LGP 330 which is caused by gravity. Also, the total area of the LGP supporting surfaces 421, 431, 441 and 451 of the LGP supporting portions 460 is set to reduce or effectively prevent popping out (e.g., movement) of the LGP 330 through the opening 470 in the LGP support 400 in a case where the backlight assembly 300 is shocked, and/or promote heat dissipation to the outside of the backlight assembly 300.

In light of distortion by the gravity and shock resistance with respect to the LGP 300, and in light of heat dissipation, the total area of the LGP supporting surfaces 421, 431, 441 and 451 of the LGP supporting portion 460 can be equal to or over about 10 percent of a whole area of a bottom surface of the LGP 300. Here, as the area of the LGP supporting surfaces 421, 431, 441 and 451 gets larger, anti-distortion, shock resistance and heat dissipation gets better. However, since an excessive area of the LGP supporting surfaces 421, 431, 441 and 451 increases volume and weight of the LGP support 400, the area of the LGP supporting surfaces 421, 431, 441 and 451 may be equal to or less than about 70 percent of the area of the bottom surface of the LGP.

Heretofore, although explanation is made with the LGP support 400 when no bridge 510, as shown in FIG. 8A, is engaged, at least one of the bridge 510 can be provided to the LGP support 400 to reduce the area of the LGP supporting surfaces 421, 431, 441 and 451 by making the bridge 510 connect opposing LGP supporting pieces 410 and 420 across the opening 470. At least one of the bridges 510 extends between the first and second LGP supporting pieces 410 and 420, and supports a portion of the reflector 360 on an area of the opening 470. Since the bridge 510 suppress the distortion or warping of the reflector 360 and/or the LGP 330 by crossing the opening 470, the total area of the LGP supporting surfaces 421, 431, 441 and 451 (460 in FIG. 2) can be reduced.

The light controller 320 is disposed above and overlaps the emitting surface 333 of the LGP 330, and controls distribution of light incident to LC panel 100 (not shown). A collection of the light source module 340, the reflector 360, the LGP 330, the light controller 320 and the LGP support 400, accommodating aforesaid parts either directly or indirectly, is the backlight assembly 300, to provide light to the LC panel 100. Each part of the backlight assembly 300 is placed respectively to save space where the parts are connected each other. Thus, corners or edges of the parts such as LGP 330 and the light controller 320 may be cut out (e.g., include a notch) or be extended out (e.g., including a protruding portion). As illustrated, for example, in FIG. 8A, the LGP 330 has a plurality of cut-out portions 337 and the light controller 320 has a plurality of overhangs 321.

The cut-out portions 337 and overhangs 321 may be disposed in vicinity of corners of the backlight assembly 300. Additionally, when the cut-out portions 337 and overhangs 321 are located at outer edges of the backlight assembly 300, the backlight assembly 300 and LCD module 1000 are made compact. Since the size of the LGP support 400 is critical to the size of the backlight assembly 300, and since the connection pieces 490 are located at corners of the LGP support 400, the connection pieces 490 may be designed to accommodate the cut-out portions 337 of the LGP 330 and the overhangs 321 of the light controller 320.

Figure 9:
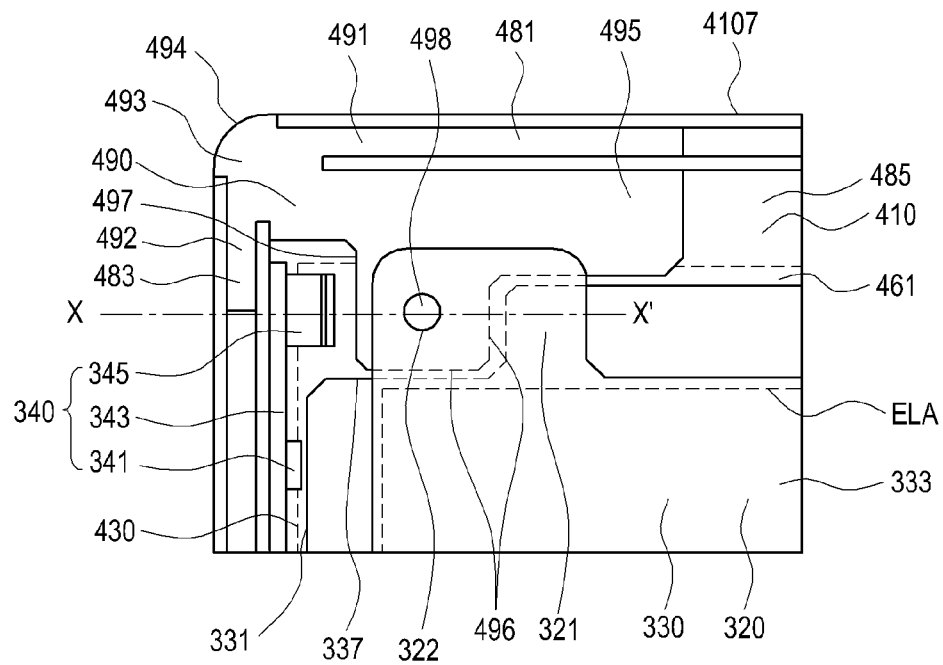
FIG. 9 is a partial plane view of a backlight assembly including a connecting piece having a structure corresponding to a cut-out portion of an LGP and an overhang of a light controller.

FIG. 9 is a partial plane view of a backlight assembly including a connection piece having a structure corresponding to a cut-out portion of a LGP and an overhang of a light controller. Referring to FIG. 9, the connection piece 490 is fixed on a corner of the LGP support 400. First and second anchors 491 and 492 are fixed to the first and second connection piece reception portions 481 and 483 respectively, and the annexed portion 493 is unified with the first and second anchors 491 and 492, such that the connection piece 490 is a single unitary indivisible member. Since the anchors 491 and 492 are located at an outer corner of the LGP support 400, the annexed portion 493 is also disposed at the outer corner of the LGP support 400 to define the outside exposure portion 494. The outside exposure portion 494 is a portion of the connection piece 490 exposed to the outside of the LGP support 400 connection piece and lies on the virtual extended line of the outer side 4107, or alternatively, is projected from the LGP support 400 and not aligned with the virtual extended line of the outer side 4107. According to the structure above, the annexed portion 493 or the outside exposure portion 494 accommodate easy assembling of the LGP support 400 and/or enhances shock resistance of the backlight assembly 300 and LCD module 1000.

Referring to FIG. 9, the connection piece 490 also has a body portion 495 which is located further towards the inside of the LGP support 400 than the first and second anchors 491 and 492, and is extended from the annexed portion 493 substantially parallel to the first and second anchors 491 and 492. According to FIG. 9, the body portion 495 is disposed within outer edges of the LGP support 400, rather than outside of the edges of the LGP support 400. In other words, the body portion 495 is disposed on (e.g., overlaps) both the first peripheral area 485 and the LGP supporting portion 460.

The body portion 495 has a LGP reception portion 496 which accommodates a cut-out portion 337 of the LGP 330. Here, the cut-out portion 337 has a notched profile, on which the corner of the rectangular LGP 330 is cut, and is located outside of (e.g., not overlapping) an effective luminance area ("ELA"). At the space cut to form the cut-out portion 337 of the LGP 330, the LGP reception portion 496 of the connection piece 490 is located, so that the different parts, the LGP 330 and the connection piece 490 are effectively interlocked with each other. With such interlocking structure of the LGP 330 and the connection piece 490, an overall size the backlight assembly 300 can be reduced, in contrast to a fully separated (e.g., non-interlocking) structure of the LGP 330 and the connection piece 490, thereby leading to more compact LCD module 1000.

The light source module 340 may be fixed on the third LGP supporting piece 430. Referring to FIG. 9, the light source module 340 has a power source substrate 343, a plurality of a light emitting diode ("LED") 341 fixed on the power source substrate 343, and a connector 345 into which a power wiring (not shown), supplying electricity to the power source substrate 343, is fixed. The LEDs 341 are point light sources which convert received electricity to optical and thermal energy, and a number of the LEDs 341 is mounted on the power source substrate 343 to face the incident surface 331 of the LGP 330. The power source substrate 343 includes signal board for transmitting electricity, and may have an additional metal layer for dissipating heat generated from the LEDs 341.

The connector 345 transmitting signals to the power source substrate 343, is located at an end (e.g., distal) portion of the power source substrate 343 where light generated by the LEDs 341 and the ELA of the LGP 330 are not reached. Since the connector 345 is connected with another connector (not shown) to which the power wiring is linked, the connector 345 is larger than a single LED 341. To save space, which is engaged by the connector 345 of the end portion of the power source substrate 343, the body portion 495 of the connection piece 490 may have a connector reception portion 497. The connector reception portion 497 may be portion cut from the body portion 495 of the connection piece 490. The connector 345 extends as far as the body portion 495 of the connection piece 490 in the z direction. Namely, an upper surface of the connector 345, located at the cut-away connector reception portion 497 of the body portion 495, is substantially on the same plane with an upper surface of the body portion 495.

The light controller 320 is located above the emitting surface 333 of the LGP 330. In exemplary embodiments, the light controller 320 is a single unit or includes various combinations of units which condense light emitted from the LGP 330, and diffuse light. The light controller 320 has an overhang 321, extended outside of the ELA and is fixed to the backlight assembly 300. The overhang 321 has a fixing hole 322 into which a light controller securing post 498 of the connection piece 490 is inserted. The light controller securing post 498 is projected from the body portion 495 to the LC panel 100, such that the connection piece 490 is a single unitary indivisible member including the light controller securing post 498.

Once the overhang 321 is fixed to the light controller securing post 498, any distortion of the light controller 320 by either external impact or heat emerged from the light source module 340 causes limited effect on the light controller 320. It may be desirable that the light controller securing post 498 is located near the ELA where the optical role of the light controller 320 is important. Accordingly, the light controller securing post 498 is located on the LGP reception portion 496 to save space of the connection piece 490 and the backlight assembly 300.

Besides connecting two adjacent LGP supporting pieces, the connection piece 490 accommodates and/or fixes other parts of the backlight assembly 300. Specifically, the connection piece 490 receives the cut-out portion 337 at the corner of the LGP 330, receives the connector 345 of the light source module 340, and reduces or effectively prevents movement of the light controller 320 with insertion of the light controller securing post 498 to the fixing hole 322 on its upper side. The LGP reception portion 496 limits movement of the LGP 330 while being horizontally overlapped with LGP 330 corners which may be shaped variously. In one exemplary embodiment, for example, the corner of the LGP 330 of FIG. 9 is cut away from the LGP 330 at the cutout portion 337. Alternatively, the corner of the LGP 330 may be projected or protruded from the main square shape of the LGP 330. Unlike FIG. 9, if the corner of the LGP 330 is protruded, then the LGP reception portion 496 of the connection piece 490 may be cut away from the body portion 495.

The connector 345 of the light source module 340 is placed at one end of the power source substrate 343 and has dimensions which are larger than individual LEDs 341. Since incidence efficiency of the incident surface 331 of the LGP 330 is enhanced as LEDs 341 are as close to the incident surface 331 as possible, the connector 345 is overlapped with the incident surface 331 in a interlocking manner. Thus, as shown in FIG. 9, to accommodate the connector 345 which is bigger than the LEDs 341 in the x direction, the connector reception portion 497 extends further than both the light incident surface 331 and the power source substrate 343 of the light source module 340.

The light controller securing post 498 is protruded from an upper surface of the LGP reception portion 496. Accordingly, along a cutting line X-X' of FIG. 9, the connector 345 of the light source module 340, the LGP reception portion 496, the light controller securing post 498 and the cut-out portion 337 of the LGP 330 are sequentially disposed. Along with the overlap of various parts, the whole backlight assembly 300 is reduced in size while a size and location of the ELA are maintained. However, partial overlap of some parts is still good for compactness of the backlight assembly 300. In an alternative exemplary embodiment, for example, even if the LGP reception portion 496 is eliminated from FIG. 9, the backlight assembly 300 can be made compact by the connector reception portion 497.

Figure 10:
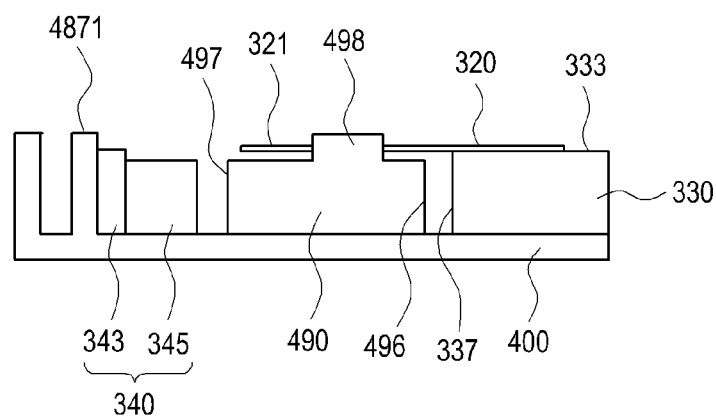
FIG. 10 is a partial cross-sectional view of the backlight assembly taken along line X-X' of FIG. 9, showing an overlapped structure among a light source module connector, a LGP reception portion, a light controller securing post and a cut-out portion of the LGP.

FIG. 10 is a partial cross-sectional view of the backlight assembly taken along the line X-X' of FIG. 9 showing overlap among the light source module connector, the LGP reception portion, the light controller securing post and the cut-out portion of the LGP. Referring to FIG. 10, the light source module 340, the connection piece 490 and the LGP 330 are very closely located within a LGP support 400. The power source substrate 343 of the light source module 340 is attached to a lateral inner wall of the mounting wall 4871 of the LGP support 400, while the connector 345 is attached on the power source substrate 343 to face the spaced apart connector reception portion 497. On the opposite side of the connector reception portion 497 within the connection piece 490, the LGP reception portion 496 keeps a constant distance to the LGP 330 in the y direction. Since the connection piece 490 is apart from the LGP 330 and the connector 345, the backlight assembly 300 maintains its shape despite thermal expansion or sudden external shock.

The light controller securing post 498 is between the connector reception portion 497 and the LGP reception portion 496. The light controller 320 is above the LGP 330 and its overhang 321, extended toward the connection piece 490, is fixedly inserted onto the light controller securing post 498 to limit the movement of the light controller 320. The distal end of the light controller securing post 498 is placed higher than the emitting surface 333 of the LGP 330, possibly up to the height of the mounting walls 4871 to securely fix the overhang 321, which is on the emitting surface 333. Additionally, an area of the connection piece 490 adjacent to the light controller securing post 498 has a sufficient height to compactly accommodate other elements of the backlight assembly 300. As depicted in FIG. 10, the connector 345 of the light source module 340, the LGP 330 and the overhang 321 are closely arranged around the connection pieces 490. Thus, the size of the LCD module 1000 is compact.

Figure 11:
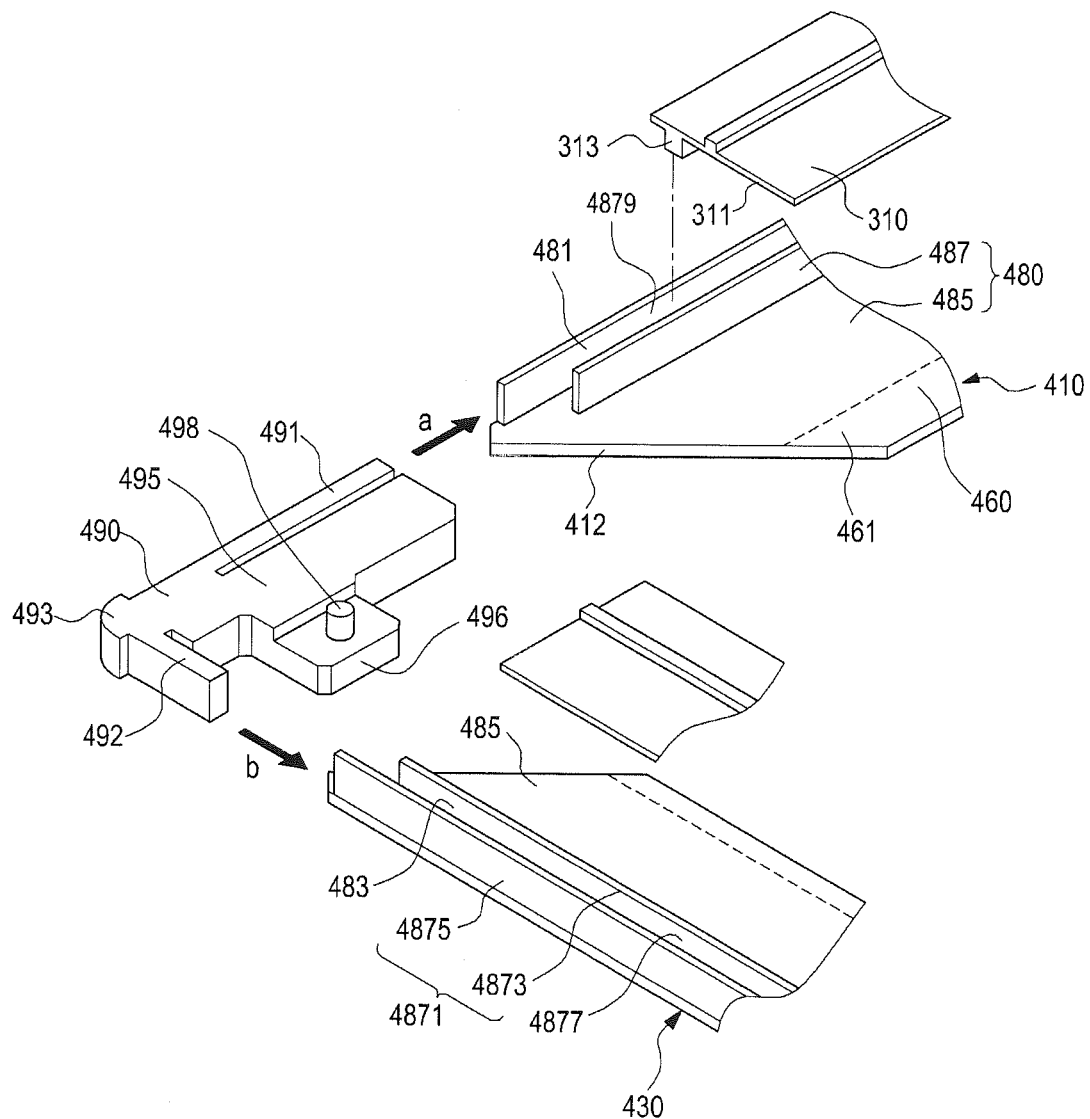
FIG. 11 is a view showing an exemplary embodiment of assembling the connecting piece into a connection piece reception portion of the adjacent LGP supporting pieces, and the intermediate support into the LGP supporting pieces, while the intermediate support is located side by side with the connection piece.

FIG. 11 is view showing an exemplary embodiment of assembling the connection pieces into connection piece reception portions of the adjacent LGP supporting pieces, and intermediate supports into the adjacent LGP supporting pieces while the intermediate supports are located side by side with the connection piece. Referring to FIG. 11, the first and second anchors 491 and 492 of the connection piece 490 are fit into the first and second connection piece reception portions 481 and 483 of the peripheral portions 480 in directions of a and b, respectively. The LGP supporting pieces 410 and 430 include metal such as aluminum, and are combined each other by FSW technology, or by a punching method using an extra part. Since the aluminum has relatively low melting point among metal materials, FSW technology may be used for combining the adjacent LGP supporting pieces. Since the stainless steel as a metal material of the LGP supporting pieces 410 and 430 has relatively high melting point and hardness, the punching method may be used for combining the LGP supporting pieces.

The material for the connection piece 490 may be the same as the LGP supporting pieces 410 and 430. With the same material, the expansion by heat of the connection piece 490 and the LGP supporting pieces 410 and 430 is the same, to enhance reliability of the backlight assembly 300. However, the material for the connection piece 490 may be the different from the LGP supporting pieces 410 and 430. In one exemplary embodiment, for example, if the LGP supporting pieces 410 and 430 include an aluminum alloy, the connection piece 490 may include a higher hardness material than the aluminum alloy, such as SECC. An LGP support 400 manufacturing process become simple if the connection piece 490 of high hardness material is inserted into and welded with the low hardness material, aluminum alloy, of the LGP supporting pieces 410 and 430. In addition, employing a high hardness connection piece 490 at the corner of the LGP support 400, which is resistant to external impact, is beneficial in fabricating a highly reliable LCD module 1000.

Alternatively, the connection piece 490 which connects metal LGP supporting pieces 410 and 430, may include either reinforced plastic or elastic plastic, by which two adjacent LGP supporting pieces 410 and 430 are connected with elastic force. The LGP supporting pieces 410 and 430 may be connected either with their side surfaces 412 and 432 directly contacting each other, or with one LGP supporting piece of the two adjacent LGP supporting pieces located upper or lower than the other in a partially overlapping manner. Whatever the structure is, the connection piece 490 is commonly overlapped with the two adjacent LGP supporting pieces 410 and 430. Since each of the LGP supporting surfaces 461 is on the same plane, either the reflector 360 or the LGP 330 is supported stably.

The connection piece 490 may be combined with the connection piece reception portions 481 and 483, which are in the peripheral portion 480. In detail, the peripheral portion 480 has a first peripheral portion 485 and a second peripheral portion 487. The first peripheral portion 485 is directly connected to the LGP supporting surface 461. The second peripheral portion 487 is extended in the substantially same plane with the first peripheral portion 485, and has the mounting walls 4871. Each of the mounting walls 4871 of FIG. 11 includes an inner wall 4873 close to the LGP supporting surface 461 and an outer wall 4875 further from the LGP supporting surface 461 than the inner wall 4873. An embedding space 4877, or channel, is formed between the inner and outer walls 4873 and 4875.

Various parts, disposed at the peripheral portion 480, may be mounted at the embedding space 4877. Referring to FIG. 11, the embedding spaces 4877 include both connection piece reception portions 481 and 483 at an end of the embedding spaces 4877 to receive portions of the connection piece 490, and intermediate support embedding portions 4879 next to the connection piece reception portions 481 and 483 to receive the intermediate support 310 (See FIG. 1). The intermediate support 310 is between the backlight assembly 300, and the LC panel 100 which receives light from the backlight assembly 300 and is supported by the intermediate support 310.

As described above, the connection piece reception portions 481 and 483 may be located next to the intermediate support embedding portion 4879 of the embedding portion 4877. If the LGP support 400 is manufactured by an extruding method, the inner and outer walls 4873 and 4875 are not bent anywhere and have a same cross-section regardless of the location of the inner and outer walls 4873 and 4875. Since different parts of the backlight assembly 300 are located side by side, the backlight assembly 300 and the LC module 100 are compact.

There are various kinds of combination between different parts. First of all, the collective intermediate support may include a plurality of separate and individual intermediates supports 310. A securing protrusion 313 of each of the intermediate supports 310 fits into the embedding space 4877. End portions 311 each of the intermediate supports 310 are spaced apart from the first and second anchors 491 and 492 of the connection piece 490. The LC panel 100 may be supported on a LC panel supporting surface 319 of the intermediate support 310. Specifically, after the first and second anchors 491 and 492 are inserted into the embedding spaces 4877, a distal end portion of the first and second anchors 491 and 492, and distal end portions 311 of the intermediate supports 310 are neither in contact nor overlap each other, but are spaced apart from each other. With the first and second anchors 491 and 492, and the distal end portions 311 separated from each other, there is a plurality of the individual intermediate supports 310 each of which are mated with a single LGP supporting piece. Each of the individual intermediate supports 310 is manufactured to be elongated longitudinally and separate from each other, thus, the plurality of the individual intermediate supports 310 can be easily handled and/or assembled.

Alternatively, the end portion 311 of the intermediate support 310 is not spaced apart from the connection piece 490, and instead overlaps with the connection piece 490. In one exemplary embodiment, for example, each of the end portions 311 of one of the intermediate supports 310 may be placed above the first and second anchors 491 and 492 each of which are fit into the embedding spaces 4877, to have overlap structure between the connector 490 and the one intermediate support 310. In designing the overlap structure, if a thicknesses in the z direction of the anchors 491 and 492 are less than the thicknesses shown in FIG. 11, and the thin first and second anchors 491 and 492 overlap with the intermediate supports 310, an increase in the overall thickness of the backlight assembly 300 is reduced or effectively prevented. In addition, overlap of different parts within the backlight assembly 300 results in the reduce or effective prevention of the light leakage, and enhances shock resistance of the backlight assembly 300.

Aforesaid, installation of the plurality of individual intermediate supports 310 is explained. However, unlike FIG. 11, there may be alternative exemplary embodiments of a single unitary indivisible intermediate support 310. The unitary intermediate support may overlap with the connection pieces 490. Here, if the connection pieces 490 are thin in the z direction, the overlap with the unitary intermediate support 310 does not increase the thickness of the backlight assembly 300. The unitary intermediate support 310 may have closed loop shape (See FIG. 1) which accommodates a simple assembling process.

Figure 12:
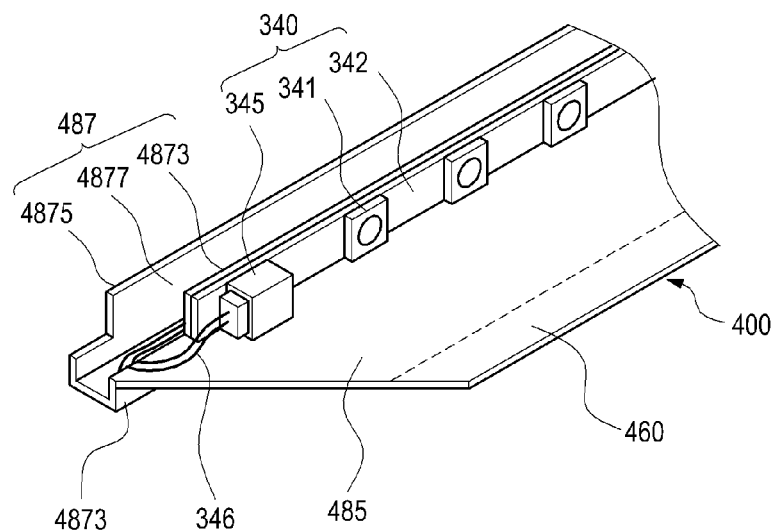
FIG. 12 is a perspective view of an exemplary embodiment of an LGP supporting piece into which a light source module and power wiring are secured.

Besides the connection piece 490 and the intermediate support 310, the light source module 340 may be mounted on at least one of the LGP supporting pieces 410 and 430. FIG. 12 is a perspective view of an exemplary embodiment of a LGP supporting piece into which a light source module and power wiring are secured. The light source module 340 has a plurality of LEDs 341, a connector 345 and printed circuit board ("PCB") 342. A power wiring 346, receiving electric signals from outside of the backlight assembly 300 and/or the LCD module 1000, is connected to the connector 345, placed on one end portion of the PCB 342. The power wiring 346 is extended from the connector 345 to an outside apparatus without interfering with the arrangement of the connection piece 490 or the intermediate support 310 at a peripheral portion of the LGP support 400.

Referring to FIG. 12, the embedding space 4877 is at the second peripheral portion 487 which is extended from the first peripheral portion 485. The second peripheral portion 487 has the inner wall 4873, the outer wall 4875 and the embedding space 4877. Together with the outer wall 4875, the inner wall 4873 forms the embedding space 4877 and extends upwardly and downwardly from the first peripheral portion 485. The light source module 340 is mounted on a LGP facing surface of the inner wall 4873, which is a vertically extended wall from the first peripheral portion 485. In other words, the light source module 340 is mounted in an inner space of the LGP support 400 and facing the LGP facing surface of the inner wall 4873.

The power wiring 346, connected to the light source module 340, is disposed at a lower space portion of the embedding space 4877 which is a channel defined by the downwardly extended inner wall 4873 and inner surface of the outer wall 4875 which is lower than the first peripheral portion 485. Even though not depicted, the intermediate support 310 fits into an upper space portion of the embedding space 4877 which is higher than the first peripheral portion 485, to be connected with the LGP support 400. As described above, the second peripheral portion 487 is extended both upwardly and downwardly from the first peripheral portion 485 to accommodate different parts at its upper and lower space portions, thus, the designing of the backlight assembly 300 becomes easier and more flexible.

Moreover, because of the bidirectional extension of the first peripheral portion 487 from the first peripheral portion 485, the total surface area of the whole LGP support 400 increases to easily dissipate heat, originally emitted from the light source module 340, via the whole LGP support 400.

Figure 13:
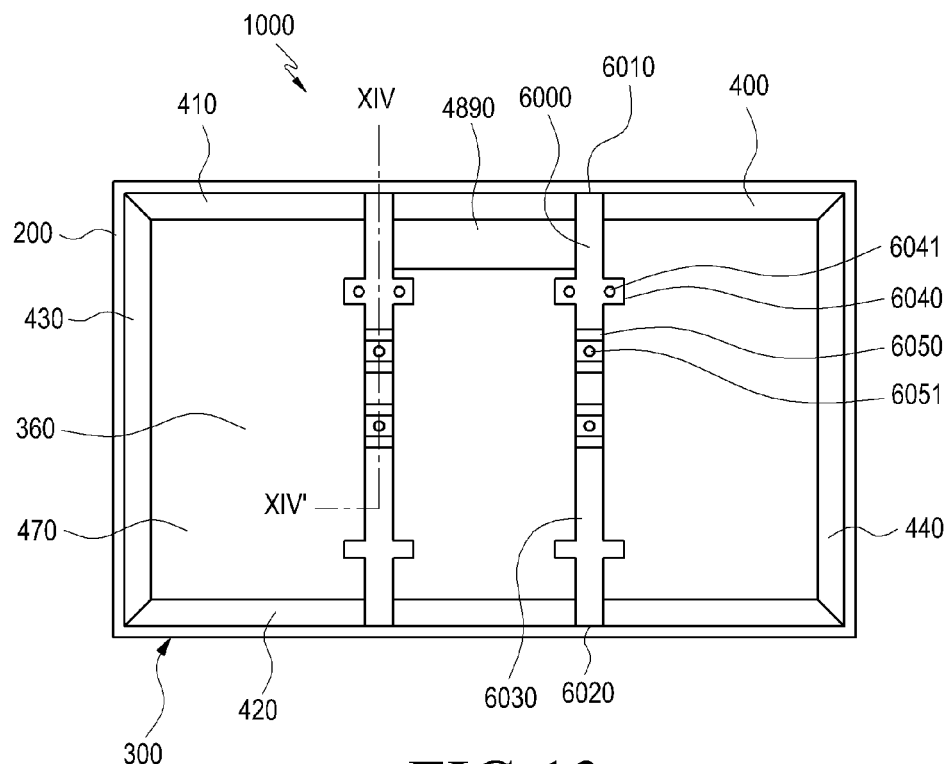
FIG. 13 is rear plane view of an exemplary embodiment of an LCD module showing a LCD module mounting member fixed on a LGP support.

FIG. 13 is rear plane view of an exemplary embodiment of a LCD module showing that LCD module mounting members are fixed on a LGP support. Referring to FIG. 13, the LGP support 400 includes four LGP supporting pieces 410, 420, 430 and 440 whose own structures and interconnection methods are introduced in FIGS. 2 through 12. On the LGP support 400, there may be an additional light source control board disposing part 4890 on which a PCB is mounted for transmitting signals to light sources within the LCD module 1000.

The light source control board disposing part 4890 is manufactured by extruding method followed by follow-up processes. Specifically, the manufacturing process of the light source control board disposing part 4890 is either partially cutting a wide LGP support plate which is extruded through lengthy nozzle, or attaching an additional plate to a narrow LGP support plate which is extruded through short nozzle. In both processes, the light source control board disposing part 4890 is extended parallel with the first LGP supporting piece 410 and toward the opening 470. With the extension structure of the light source control board disposing part 4890, the whole LGP support 400, having light source control board disposing part 4890, overlaps the LGP 330 (not shown) and the reflector 360 more widely. Thus, the backlight assembly 300 accommodates heat dissipation more easily and has enhanced securing structure of the inner parts of the backlight assembly 300, such as the LGP 330 and the reflector 360.

On the other hand, excessive use of the material or increase of weight and volume of the LGP support 400 may be caused if the whole LGP support 400 excessively overlaps the LGP 330 or the reflector 360, while establishing stable structure. Accordingly, the overlap area of the LGP support 400, and the LGP 330 (not shown) and the reflector 360, is limited to proper range. Specifically, the overlap area between the whole LGP support 400 with the light source control board disposing part 4890, and either the LGP 330 or the reflector 360 is no more than about 30 percent of the area of either the LGP 330 or the reflector 360. In other words, more than about 70 percent of the reflector 360 is exposed to an outside of the LCD module 1000. With the proper overlap area, the LCD module 1000 can accommodate effective heat dissipation and structural stability while the weight, volume, and amount of the material are saved.

The LCD device is assembled in a manner that the LCD module 1000 is fixed in between additional upper and lower cases. The ultimate customer may use the LCD device by connecting or fixing the LCD device on external component, such as wall of a building. In connecting the LCD device with the external component, the LCD device in a conventional structure has been unnecessarily bulky and heavy because an LCD module mounting member is either at the lower cover of the LCD module or shielding the whole back surface of the LCD module, while being located between the LCD module and the back cover. On the contrary, unlike the conventional art, according to the exemplary embodiments of the invention, at least one stripe-shaped LCD module mounting member 6000, connected to the external component, is disposed between the lower case of the LCD device and the LCD module 1000. Thus, the opening 470 of the LCD module 1000 is exposed to an outside of the LCD device, to make the LCD device compact and light.

Specifically, the LCD module 1000 of FIG. 13 has a plurality of LCD module mounting members 6000, installed on the external component where the LCD device is connected to a stationary member, such as a wall of a building. Here, the stationary member may also be in various shapes. In one exemplary embodiment, the stationary member is a vertically extended structure which stems from a pedestal, and on which the LCD device is mounted at an end point of the vertical extension.

The LCD module mounting members 6000 may be members vertically extending to be fixed with a first end at the first LGP supporting piece 410 and a second end opposing the first end at the second LGP supporting piece 420. Accordingly, the LCD module 1000 can be thin and light. The LCD module mounting member 6000 can be used as a media for connecting the LCD device and the external component as already described. Additionally, the LCD module mounting members 6000 may play the same role with the bridge 510 as shown in FIG. 8A.

Referring to FIG. 13, according to the exemplary embodiment of the invention, each LCD module mounting member 6000 has first and second end portions 6010 and 6020. The first end portion 6010 is fixed to the first LGP supporting piece 410 on a top side of the LGP support 400, when the LCD device is positioned for viewing. The second end portion 6020 is fixed to the second LGP supporting piece 420 on a bottom side of the LGP support 400, when the LCD device is positioned for viewing. If the LCD module 1000 within the LCD device is installed on the external component such as a wall, since the gravity acts on the LCD device, each of the striped LCD module mounting members 6000 does not have to be excessively wide. Furthermore, to balance the LCD device on the external component, the LCD module mounting member 6000 can be disposed in plural within the LCD device, while being arranged about the center of the LCD device.

Whether in single or in plural, the LCD module mounting member 6000 is manufactured in narrow and longitudinal shape, and is compact. The narrower the LCD module mounting member 6000, the wider the exposed area of the reflector 360 of the LCD module 1000. Accordingly, since the LCD device is manufactured to have more than about 30 percent of the reflector 360 exposed at the backside of the LCD module 1000, the LCD device can be light. Also, since the LCD module mounting member 6000 connects opposing LGP supporting pieces, mechanical characteristics of the LCD module 1000 is enhanced by reducing or effectively preventing distortion of the LGP support 400, backlight assembly 300 and LC panel 100. Further, if the light source module 340 is mounted on the LGP supporting piece directly combined with the LCD module mounting member 6000, heat dissipation may be enhanced.

For enhancing mechanical characteristics, a hardness of the material of the LCD module mounting member 6000 is higher than the hardness of the LGP support 400. In one exemplary embodiment, for example, if the material of the LGP support 400 is aluminum alloy, the material of the LCD module mounting member 6000 may be stainless steel of higher hardness. Since material of high hardness is resistive to external force or impact, bending or distortion of the parts of the backlight assembly 300, especially bending or distortion of the LGP 330 caused by humidity, heat or shock, is suppressed. Since the LCD module mounting member 6000 and the LGP support 400 are different materials, screwing or TOX®, one kind of punching method, may be used.

Alternatively, the material of the LCD module mounting member 6000 is the same as the material of the LGP support 400. In one exemplary embodiment, for example, if the LCD module mounting member 600 has the same material with the LGP support 400, aluminum alloy, the stiffness can be enhanced by combining both parts with FSW technology, the welding method using melting and mixing materials in a relatively wide area of both parts. Moreover, since the heat transmission coefficient of the aluminum alloy is as high as 130 watts per meter Kelvin (W/mK), it is beneficial to heat dissipation.

Each of the LCD module mounting members 6000 of FIG. 13 has a main portion 6030, a first expansion portion 6040 (e.g., an ear) and a second expansion portion 6050. The main portion 6030 is substantially parallel with the reflector 360 and elongated in an extension direction of the LCD module mounting member 6000. Ears, which are a pair of the first expansion portion 6040, are also substantially parallel with the reflector 360, but projected to be crossed with the extension direction of the main portion 6030. Thus, the first expansion portion 6040 may be as thick as the main portion 6030 (e.g., not spaced apart from the main portion 6030) and has first locking holes 6041 at an inner area thereof to be connected to an external component. The external component is a member attached to the lower case of the LCD device and may be either a hanger for hanging the LCD device on a wall of a building, or for hanging the LCD device on stand-like vertical structure that supports LCD device. Alternatively, the first locking hole 6041 may be placed on the main portion 6030. Whether placed on the main portion 6030 or the first expansion portion 6040, the location of the first locking hole 6041 is on the upper side of the LCD module 1000, that is, towards the first LGP supporting piece 410 with respect to a midpoint of the LCD module 1000, to stably secure the LCD module 1000 on the external component.

The second expansion portion 6050 is an upwardly projected portion from the main portion 6030, in the z direction. Namely, the second expansion portion 6050 may have a portion which is not parallel to a plane of the reflector 360, and is spaced apart from the reflector 360. A separation space is defined between the reflector 360 and the unparallel portion of the second expansion potion 6050. The second expansion portion 6050 includes a second locking hole 6051 spaced apart from the reflector 360, and which may be used with the external component. Since the second locking hole 6051 is spaced apart from the reflector 360, the external component for use with the second locking hole 6051 may be longer than the external component used with the first locking hole 6041 which is not spaced apart from the reflector 360. From second expansion portion 6050 in an area adjacent to the second locking hole 6051, a tab may be extended toward the main portion 6030.

It should be noted that even though the first and second locking holes 6041 and 6051 are explained as a member combined with external components, alternatively, they may be used in mounting other members on the LCD device or LCD module 1000.

Figure 14:
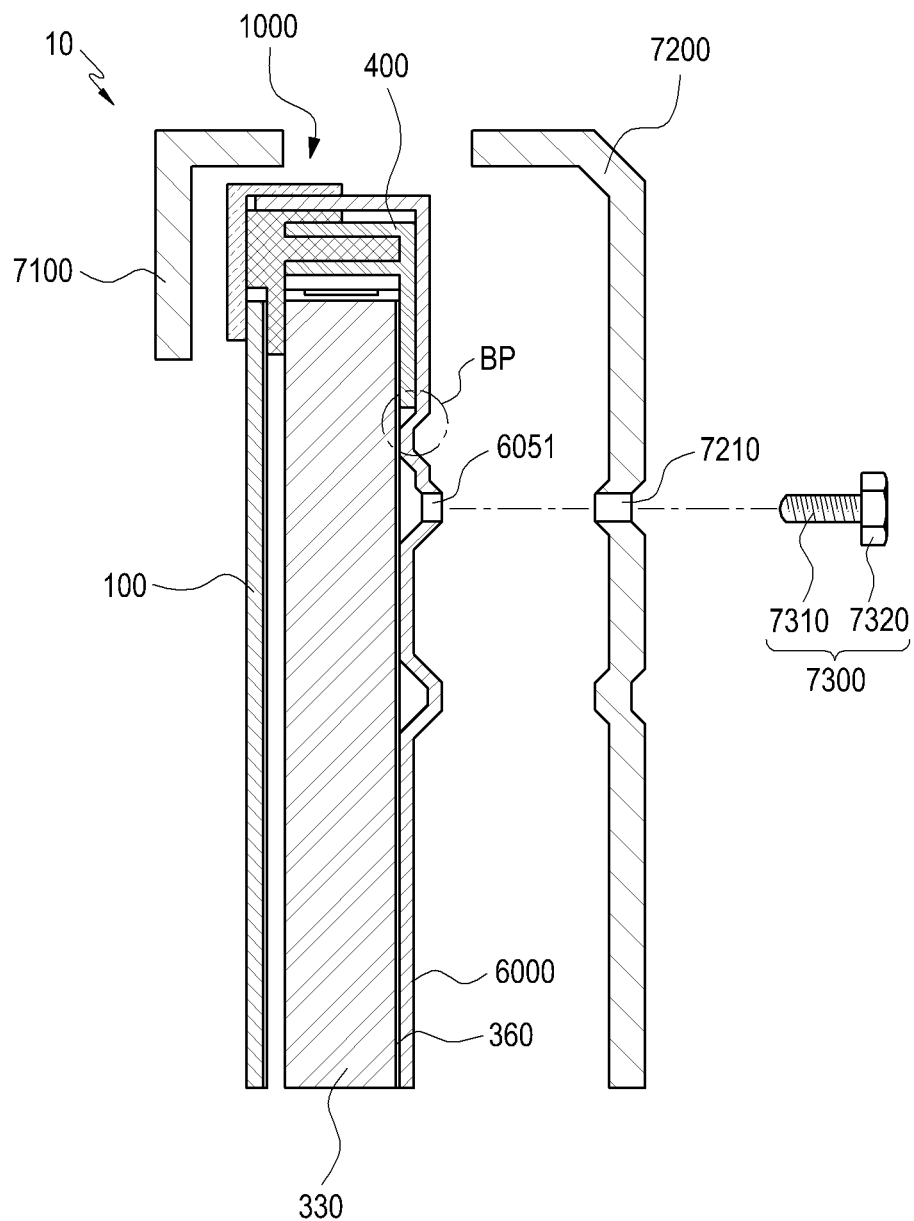
FIG. 14 is a cross-sectional view of an exemplary embodiment of assembling an LCD device including upper and lower cases onto the LCD module taken along line XIV-XIV' of FIG. 13.

FIG. 14 is a cross-sectional view of an exemplary embodiment of assembling a LCD device including upper and lower cases, onto the LCD module taken along line XIV-XIV' of FIG. 13. Referring to FIG. 14, the LGP 330 is closely placed onto one side of the reflector 360, while the LGP support 400 and LCD module mounting member 6000 are placed at an opposing other side of the reflector 360 from the one side. The LGP support 400 both supports and contacts the reflector 360, thereby the reflector 360 is closely placed to the LGP 330.

The LCD module mounting members 6000 are combined with the LGP support 400, and are extended toward opening 470 of the LGP support 400. The LCD module mounting members 6000 may be spaced apart from the reflector 360 where the space has a depth in the z direction substantially equal to a thickness of the LGP support 400 where there is no bent point of the LCD module mounting members 6000 from the LGP support 400. Alternatively, the LCD module mounting members 6000 may be adhered directly to the reflector 360 where there is a bent point BP of the LCD module mounting members 6000 from the LGP support 400. Regardless of the adhesion of the LCD module mounting member 6000 to the reflector 360, since the LCD module mounting members 6000 are placed near the reflector 360, a LCD device 10 become thinner than a LCD device of the conventional art whose LCD module mounting member is spaced far from the reflector. In addition, the adhesion structure of the adhesion of the LCD module mounting member 6000 to the reflector 360 of the invention may enhance the reliability of the LCD device 10 with the increased overlap area.

The LCD device 10 of FIG. 14 has an upper case 7100 as a front part (e.g., at the viewing side), a lower case 7200 as a rear part and the LCD module 1000 located between the upper case 7100 and the lower case 7200. The ultimate customer can see the upper case 7100, an active display area of the LC panel 100 on which images are recognized by the ultimate customer, and an exposed part of the lower case 7200. Referring to FIG. 14, the second locking hole 6051 is aligned with a through hole 7210 of the lower case 7200 which is exposed to outside, to be connected with an external component 7300.

The external component may be either a hanger which fixes the LCD device 10 on a part of a building such as a wall, or a stand structure which vertically supports the LCD device 10. In FIG. 14, the hanger is an example of the external component. The external component 7300 has both a combining portion 7310, which is directly combined with the through hole 7210 and the second locking hole 6051, and a hanging portion 7320, which is fixed to a wall. The combining portion 7310 may be a screw or rivet. Additional apparatus may be applied to the hanging portion 7320 for being connected to the wall of the building.

Figure 15A:
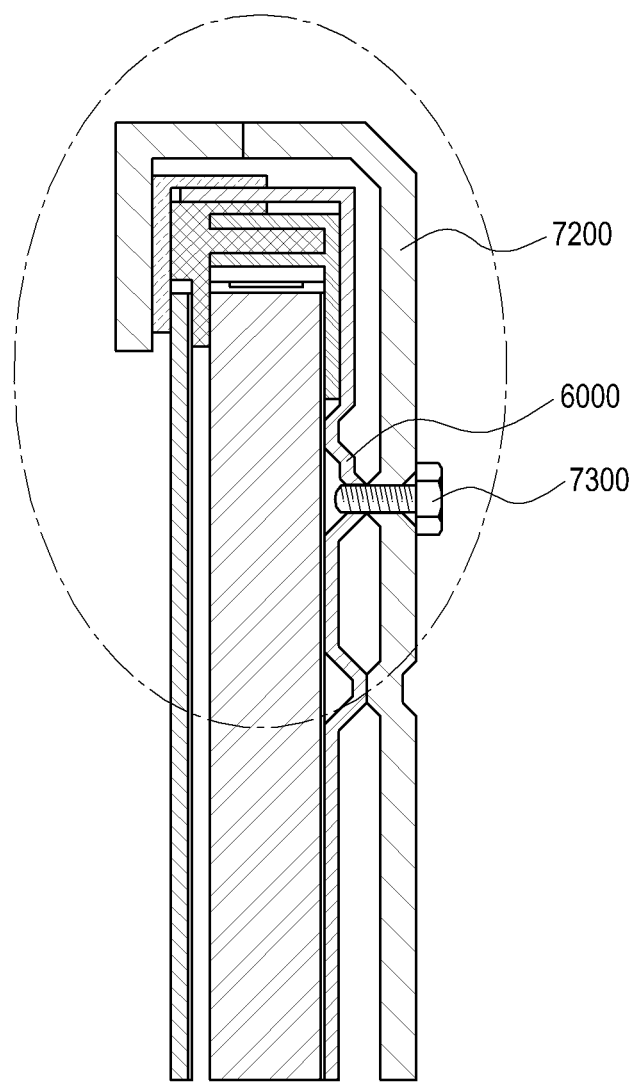
FIG. 15A is a cross-sectional view of an exemplary embodiment of an LCD device in which the lower case and the LCD module are combined by an external component.
Figure 15B:
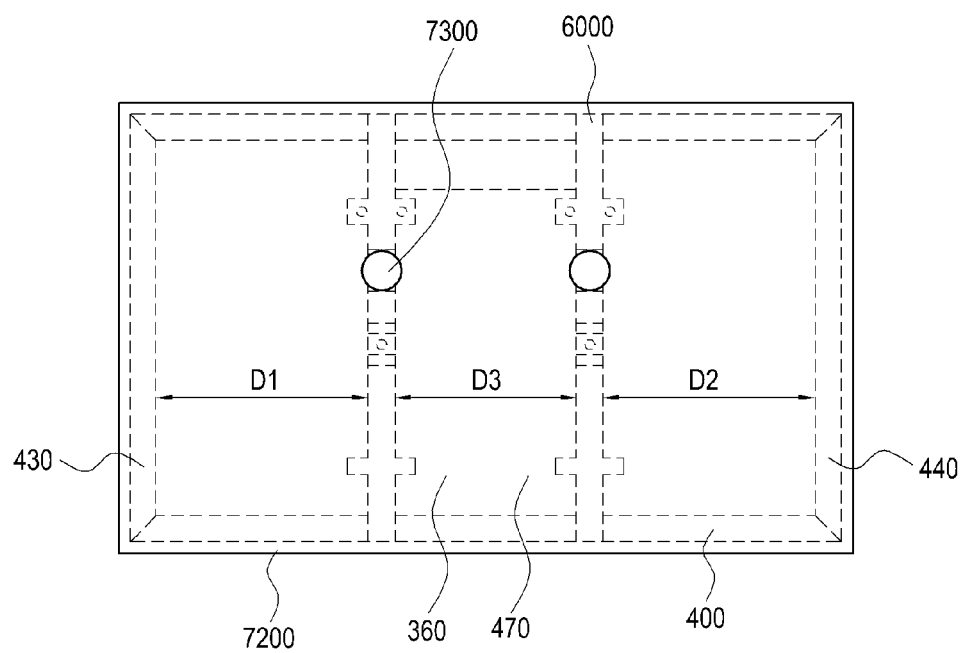
FIG. 15B is a rear plane view of an exemplary embodiment of an LCD device depicting an LCD module having a LCD module mounting member, a lower case covering the LCD module, and an external component combining the LCD module mounting member of the LCD module and the lower case.

FIG. 15A is a cross-sectional view of an exemplary embodiment of a LCD device where the lower case and the LCD module are combined together by an external component. FIG. 15B is a rear plane view of an exemplary embodiment of a LCD device depicting an LCD module having a LCD module mounting member, a lower case covering the LCD module, and an external component combining the LCD module mounting member of the LCD module and the lower case.

In FIG. 15A, the external component 7300 combines both of the LCD module mounting member 6000 and the lower case 7200 to each other. Thus, the LCD device 10 of the exemplary embodiment is thinner than the conventional LCD device whose external component combining portion on the lower case is differently located from the combining point of the LCD module and the lower case. Furthermore, since the LCD module mounting members 6000 are elongated in a narrow stick-like shape, and partially cover the opening 470 of the LGP support 400, the LCD device 10 of the exemplary embodiment may be more compact and lighter than the conventional LCD device whose whole back surface is covered by separate member.

Referring to FIG. 15B, the third and fourth LGP supporting pieces 430 and 440, which run parallel to the LCD module mounting member 6000, are spaced apart from the LCD module mounting members 6000 by distances D1 and D2, respectively, while inter mounting member distance is D3. D1 may be substantially the same as D2. Alternatively, D3 may be substantially the same with D1 and D2, to equally divide the back surface of the LCD module 1000. At the separation spaces D1, D2 and D3, the reflector 360 is exposed. The exposed area of the reflector 360 may be more than 30% of the whole reflector area when the LCD module mounting member 6000 is apart from the LGP supporting pieces 430 and 440.

As the LCD module mounting member 6000 connects opposing LGP supporting pieces 410 and 420 of the LGP support 400, bending of the LGP support 400, caused by thermal or mechanical impact, may be reduced or effectively prevented. Also, since the LCD module mounting member 6000 is longitudinally extended parallel to a direction of gravity, when the LCD device 10 is positioned for viewing, the LCD device 10 may be hung on the wall stably. However, even where the LCD module mounting member 6000 does not run parallel to gravity, connecting the opposing LGP supporting pieces enhance mechanical stability of the LCD device 10 by reducing the degree of bending.

Figure 16:
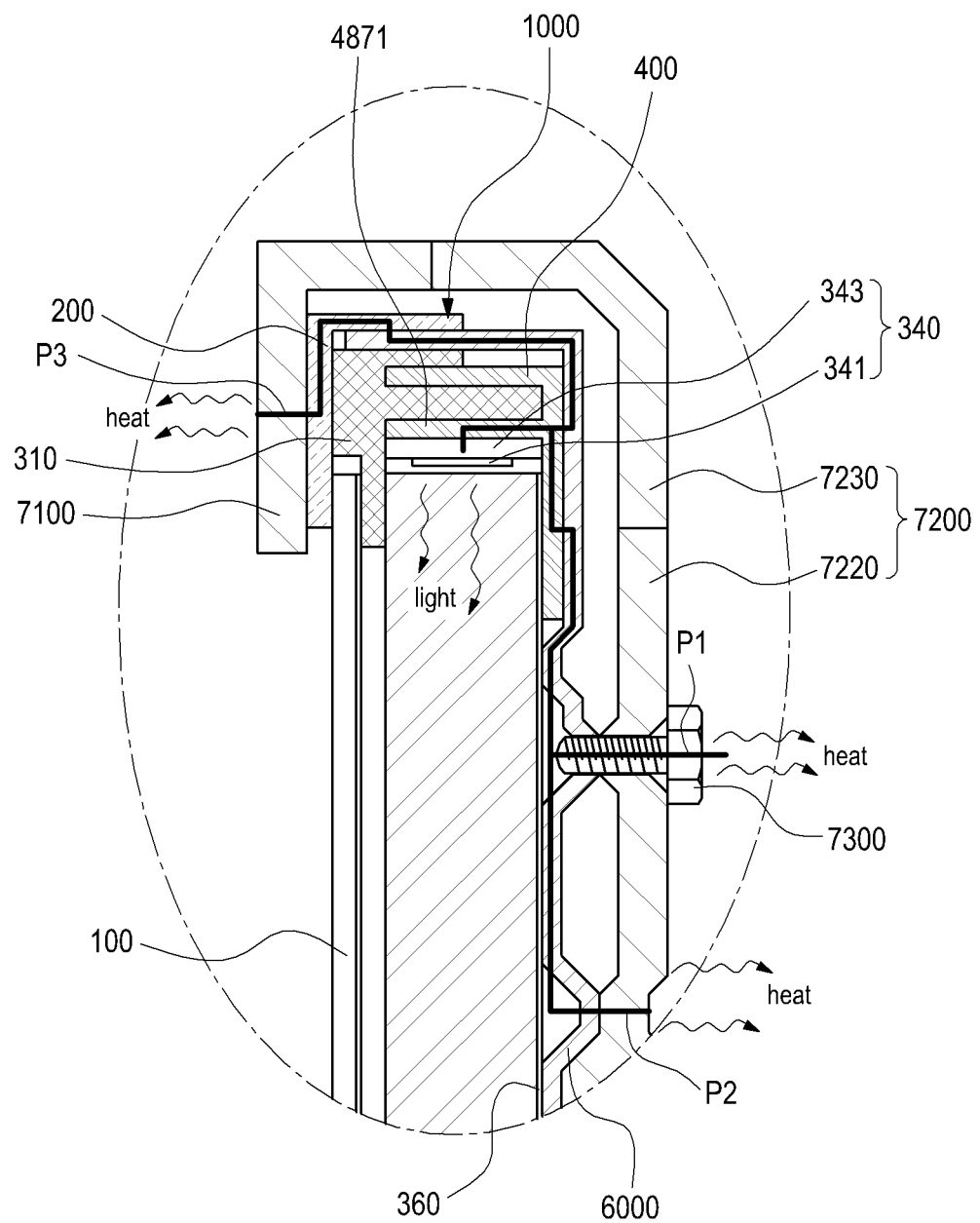
FIG. 16 is a partial cross-sectional enlarged view of a side of the LCD device of FIG. 15A, showing a path through which the heat originated from the light source module is dissipated.

FIG. 16 is a partial cross-sectional enlarged view of the LCD device 10 of FIG. 15A showing a passage the heat originated from the light source module 340 is dissipated. Referring to FIG. 16, the light source module 340 is located at the edge of the LCD module 1000, as the LCD module 1000 has edge type backlight assembly 300. The light source module 340 has a plurality of LEDs 341 and a power source substrate 343 which is fixed on an inner lateral surface of the inner wall 4873 of the mounting wall 4871. The light source module 340 converts a part of the provided energy to optical energy, while the rest energy is converted into thermal energy. The thermal energy may deteriorate LC molecules within the LC panel 100 or deform other parts of the LCD module 1000 to lower the image quality of the LCD device 10. Thus, the thermal energy should be released to an outside of the LCD device 10.

Referring to FIG. 16, the heat originated from the LED (e.g., light source) 341 is transmitted with various routes. As shown with heat path P1, heat can be transmitted to the lower case 7200 and the external component 7300 via the power source substrate 343, the LGP support 400, and the LCD module mounting member 6000. The parts in heat passage P1 have a high heat transmission coefficient to release heat easily.

In one exemplary embodiment, for example, each LED 341 has a chip and a package mounting the chip. The package may contain metal member for promoting dissipation. The power source substrate 343 may be a metal core printed circuit board ("MCPCB") whose combination is an insulation layer and metal plates. The insulation layer has signal transmitting conductive pattern. The metal plate is thicker than the insulation layer, supports the insulation layer and fixed to the lateral surface of the inner wall 4873. However, it is also required that the intermediate support 310 has heat transmission coefficient as low as possible to prevent heat transmission from the light source 341 to the LC panel 100.

Even though not depicted, in the heat path P1, the LGP support 400 can be directly connected to heat dissipating external components, by extending a reflector supporting part of the LGP support 400 to the middle of the reflector 360. The extended reflector supporting part of the LGP support 400 can contact the lower case 7200 directly. If the contact point of the extended reflector supporting part and the lower case 7200 has a high heat transmission coefficient such as by including metal material, heat dissipation is accomplished more easily. Heat path P2 shows that the direct contact of the LCD module mounting members 6000 and the lower case 7200 can accommodate heat release. The lower case 7200 may have high heat transmission coefficient material such as metal at the point of contact with the LCD module mounting members 6000. Heat releasing area is maximized if the metal is adapted to the whole lower case 7200.

On the other hand, metal may be adapted to a portion of the lower case 7200. In one exemplary embodiment, for example, referring to FIG. 16, the area of the lower case 7200, engaged in the heat path P2, may include metal material while a remainder of the lower case 7200 includes a low heat transmission coefficient material. If the heat paths P1 and P2 are applied at the same time, high heat transmission coefficient material is used in a P1 engaging structure of the lower case 7200. A heat dissipation portion 7220 of the lower case 7200 is an area directly engaged in the heat paths P1 and P2. A remaining portion of the lower case 7200 such as a rim, where user may frequently touch, is made of the lower heat transmission coefficient material to be a thermal insulating portion 7230 of the lower case 7200. However, the thermal insulating portion 7230 is not limited to the rim of the lower case 7200 and the LCD device 10.

Heat of the light source module 340 can be dissipated via the upper cover 200 of the LCD module 1000. In FIG. 16, heat path P3 shows heat is transmitted to the LCD module mounting members 6000 and the upper cover 200 via LGP support 400. Heat of the upper cover 200 is released to outside by contact with the upper case 7100. To prevent heat transmission to the LC panel 100 from the upper case 7100, a thermal insulator (not shown) of the upper cover 200 may be located between the upper cover 200 and the LC panel 100. Thus, high image quality of the LCD device 10 is obtained.

The parts of the LCD device 10 involved in the heat paths P1 through P3 have high heat transmission coefficient. In one exemplary embodiment, for example, well known aluminum alloy Al5052, iron alloy SECC, and stainless steel alloy SUS304 may be used for the power source substrate 343, the LGP support 400, the LCD module mounting member 6000, the lower case 7200, the upper cover 200, and the upper case 7100, as those materials have good thermal conductivity. Specifically, the thermal conductivities of the materials are 138 W/mK for Al5052, 52 W/mK for SECC, and 16.2 W/mK for SUS304. The material used in the power source substrate 343, the LGP support 400, the LCD module mounting member 6000, the lower case 7200, the upper cover 200, and the upper case 7100 of the LCD device 10 has thermal conductivity higher than 15 W/mK for effective heat transmission and dissipation.

Figure 17:
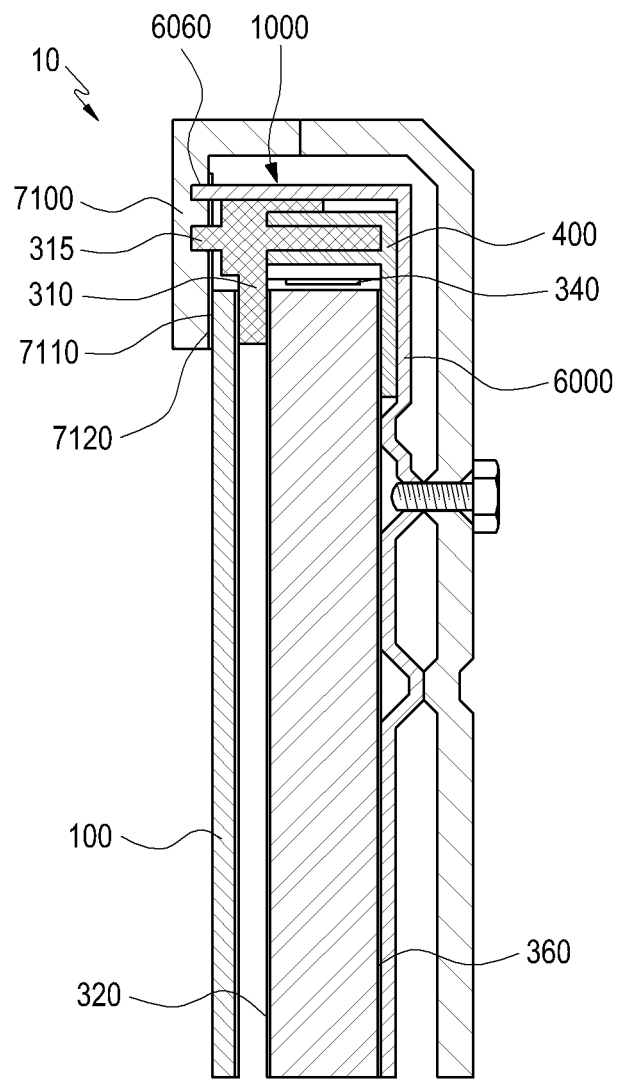
FIG. 17 is a partial cross-sectional view of the LCD device of FIG. 15A in which the upper cover is eliminated and an upper case covers the liquid crystal ("LC") panel.

FIG. 17 is a partial cross-sectional view of the LCD device of FIG. 15A, where the upper cover 200 is eliminated and the upper case 7100 covers edges of the LC panel 100. Referring to FIG. 17, as the upper cover 200 is not used in the LCD module 1000, the LCD device 10 of FIG. 17 may be thinner than the LCD device 10 of FIG. 15A. Accordingly, the whole LCD device 10 can be thinner as the upper case 7100 directly covers the LC panel 100. Heat of the light source module 340 of FIG. 17 is released with the same path and structure of FIG. 16, and the upper case 7100 uses metal material of high thermal conductivity. To prevent direct heat transmission from the upper case 7100 to the LC panel 100, thermal insulator 7110 may be located directly on the lower surface of the upper case 7100 between the upper case 7100 and the LC panel 100.

The LCD device 10, having the LCD module 1000 with no upper cover 200, may be assembled by either placing the LC panel 100 and backlight assembly 300 on the upper case 7100, or covering the LC panel 400 disposed on the backlight assembly 300, with the upper case 7100. Between both processes above, FIG. 17 shows a cross-section of LCD device 100 where the LC panel 100 and the backlight assembly 300 are sequentially stacked on the upper case 7100. The specific process of stacking the components includes placing the upper case 7100 on a jig while an inside 7120 of the upper case 7100 faces an outside, placing edges of the LC panel 100 on the inside 7120 of the upper case 7100, and connecting the inside 7120 to a combining portion 315 of the intermediate support 310. The combining portion 315 may be protrusion, rivet or a hole for screwing.

Afterwards, the light controller 320, the LGP 330 and the reflector 360 are arranged on the intermediate support 310, and the light source module 340 on the LGP support 400 is combined with the intermediate support 310 to complete assembly of the backlight assembly 300 and the LCD device 10. Here, to securely combine the LCD module 1000, the LCD module mounting members 6000 may be combined directly with the upper case 7100. In FIG. 17, a fixing portion 6060 of the LCD module mounting member 6000 is fixed directly to the inside 7120 of the upper case 7100, thereby LCD module 1000 can be fixed to the upper case 7100.

Figure 18:
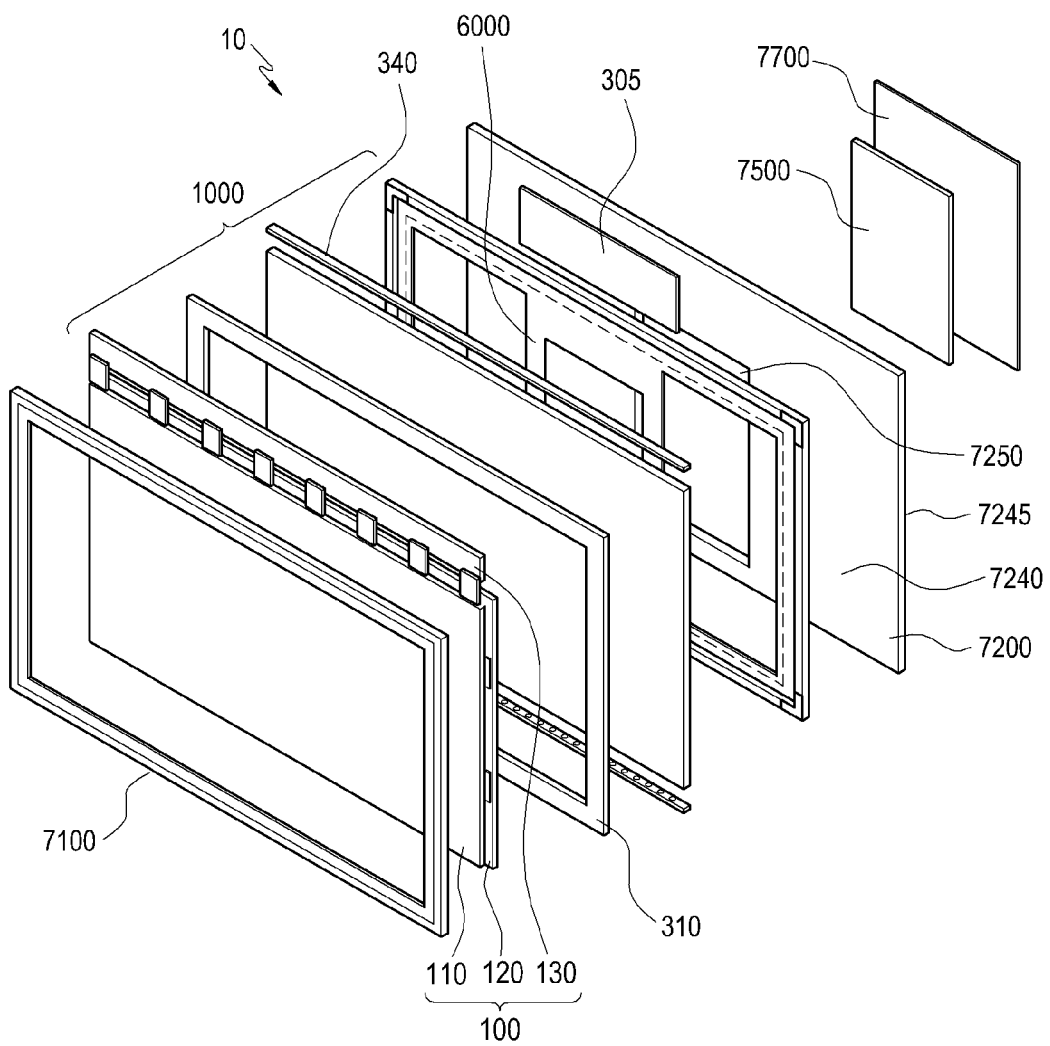
FIG. 18 is an exploded perspective view of the LCD device of FIG. 17 showing a lower case, the circuit board, the backlight assembly, and the LC panel sequentially stacked from the lower case to the upper case.

FIG. 18 is an exploded perspective view of the LCD device of FIG. 17 showing the LC panel, the backlight assembly, the circuit board and the lower case are sequentially stacked to the upper case. Referring to FIG. 18, the LC panel 100, the intermediate support 310, the backlight assembly 300 and an LCD module driver 305 are sequentially disposed and fixed onto the upper case 7100. The LCD module driver 305 provides LC panel signals to LC panel drivers 130 which drive a common electrode and pixels of the substrates 100 and 120 of the LC panel 100. Alternatively, the LCD module driver 305 may have LC panel driver driving circuits along with circuits which adjust luminance of the light source module 340.

The intermediate support 310 and the LCD module mounting members 6000 of the LCD module of FIG. 18 may be directly combined with the upper case 7100 as shown in FIG. 17. According to exemplary embodiments of the invention, the upper case 7100 is combined with the edges of the lower case 7200, while the LCD module 1000 is pre-combined with the upper case 7100, to form an exterior of the LCD device 10. Thus, it is easily understood by the person of ordinary skill in the art that the aforesaid manufacturing process of the invention can be done by the LCD module manufacturer.

On the contrary, a conventional LCD module manufacturer completes the LCD module by fixing the LC panel, the backlight assembly and the LCD module driver with the upper cover, then, provides the LCD module to a LCD device manufacturer. The LCD device manufacturer fixes additional components, which provides various functions that the ultimate users need, to the LCD module. After that, the LCD device manufacturer completes the LCD device by fixing the LCD module to an additional upper and lower case to provide the LCD device to the ultimate customer. The aforesaid conventional LCD device manufacturing process is well known to a person of ordinary skill in the art.

However, in the exemplary embodiments of the invention, unlike the conventional method, the LCD module manufacturer manufactures the upper case 7100, the lower case 7200 and the LCD module 1000. The LCD device manufacturer also manufactures additional components, which provides various functions that the ultimate customer needs, and assembles the additional components with the semi-finished LCD module, provided by the LCD module manufacturer, to complete the LCD device.

For the manufacturing process of the invention described above, the lower case 7200 of the LCD device 10 has a covering portion 7240, whose edges are aligned to edges of the upper case 7100, and a passage 7250 which is a cut-away portion of the covering portion 7240. A location of the passage 7250 corresponds to the locations of the additional components 7500 on the LCD module 1000. The additional components 7500 are parts manufactured by the LCD device manufacturer in light of various functions and standards corresponding to customer's preference and market trend.

In one exemplary embodiment, for example, the additional component 7500 is power board that converts voltage of a building to the voltage of the LCD device. Alternatively, the additional component may be at least one of composite image signal processing board that receives a composite image signal, which is the originally combined signal of audio and video signal, and converts the combined signal to the signals properly used in the LCD device, a light source signal board that produces a light source signal from the video signal of the composite image signal, and/or a speaker that produces sound from the audio signal of the composite image signal, those of which may be designed by the LCD device manufacturer.

The LCD module manufacturer provides semi-finished LCD device, which includes the combination of an upper case 7100, a lower case 7200, and LCD module 1000, to the LCD device manufacturer. The passage 7250 of the lower case 7200 of the semi-finished LCD device exposes a part of the LCD module 1000. The LCD device manufacturer mounts additional components 7500 on the passage having LCD module and shields the passage 7250 with a lid 7700 to finish the manufacturing of the LCD device 10. According to process above, production time or cost for manufacturing of the LCD device can be lessened as the LCD device manufacturer simply mounts additional components 7500 on the predetermined position of the semi-finished LCD device and shields the additional component with a lid to complete the LCD device 10.

Figure 19:
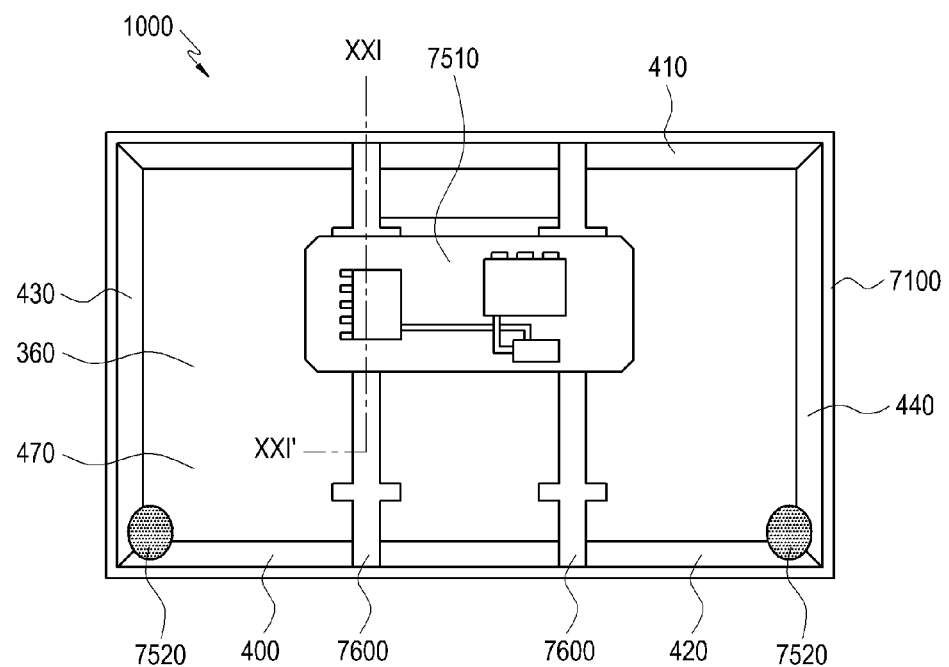
FIG. 19 is a plane view of an exemplary embodiment of a LCD device showing a structure including an additional component mounted on a back side of an LCD module.

FIG. 19 is a plane view of an exemplary embodiment of a LCD device showing an additional component mounted on a back side of a LCD module which is provided by LCD module manufacturer. Referring to FIG. 19, the LCD module 1000 has the LGP support 400 and an additional component mounting member 7600. The LGP support 400 supports the LGP 330 (not shown) and the reflector 360 of the backlight assembly 300, and exposes a part of the reflector 360 through the opening 470 to outside of the LCD module 1000.

The additional component mounting member 7600 partially covers (e.g., overlaps) the reflector 360 by connecting a pair of opposing LGP supporting pieces 410 and 420, or 430 and 440. The additional component mounting member 7600 is arranged to cross the backside of the LCD module 1000 in a horizontal, vertical or diagonal direction for lessening the bending of the frame structured LGP support 400, such as from thermal or mechanical impact. The additional component mounting members 7600 of FIG. 19 are arranged in parallel to short sides of the LGP support 400, that is, the third and fourth LGP supporting pieces 430 and 440.

The additional components, exampled in FIG. 19, are a main board 7510 and a pair of speakers 7520. The main board 7510 is mounted on the LCD module 1000 by the LCD device manufacturer. The main board 7510 receives power signal and/or a composite image signal that has both an audio and video signal, converts the composite image signal to signals proper to the LCD module 1000, and provides the converted signal to the LCD module 1000. Specifically, the composite image signal is split into audio and video signals. The video signal is converted to be proper for driving the LCD module 1000 while the audio signal is converted for being outputted from the speakers 7520.

The main board 7510 and the speakers 7520 can be located anywhere on the backside of the LCD module 1000. In one exemplary embodiment, for example, the main board 7510 and the speakers 7520 can be mounted on the additional component mounting member 7600 or on the LGP support 400. In FIG. 19, the main board 7510 is mounted on the additional component mounting member 7600, and thus, overlapped with the opening 470 of the LCD module 1000. The speaker 7520 is disposed on the LGP support 400 and is mounted without using an additional part for mounting. Although the additional components of FIG. 19 are disposed on different parts of the LCD device 10, and apart from each other, the different additional parts can be mounted on single part.

In addition, even though the additional component mounting member 7600 of FIG. 19 is disposed to partially overlap with the opening 470 where the reflector 360 is exposed, the shape of the additional component mounting member 7600 can be changed as long as the passage 7250 of the lower case 7200 corresponds to the location of the additional component. In one exemplary embodiment, for example, the additional component mounting member 7600 can be expanded to cover (e.g., overlap) most of the reflector 360.

The shape or location of the additional component mounting member 7600 may be similar to that of LCD module mounting member 6000 of FIG. 13. By using the similar shape and location, external components (not shown), besides the additional components, may be mounted on the additional component mounting member 7600. Here, since various kinds of parts are mounted on a single member, the whole LCD device 10 can be light, compact and thin. Further, the manufacturing process can be simplified.

Figure 20:
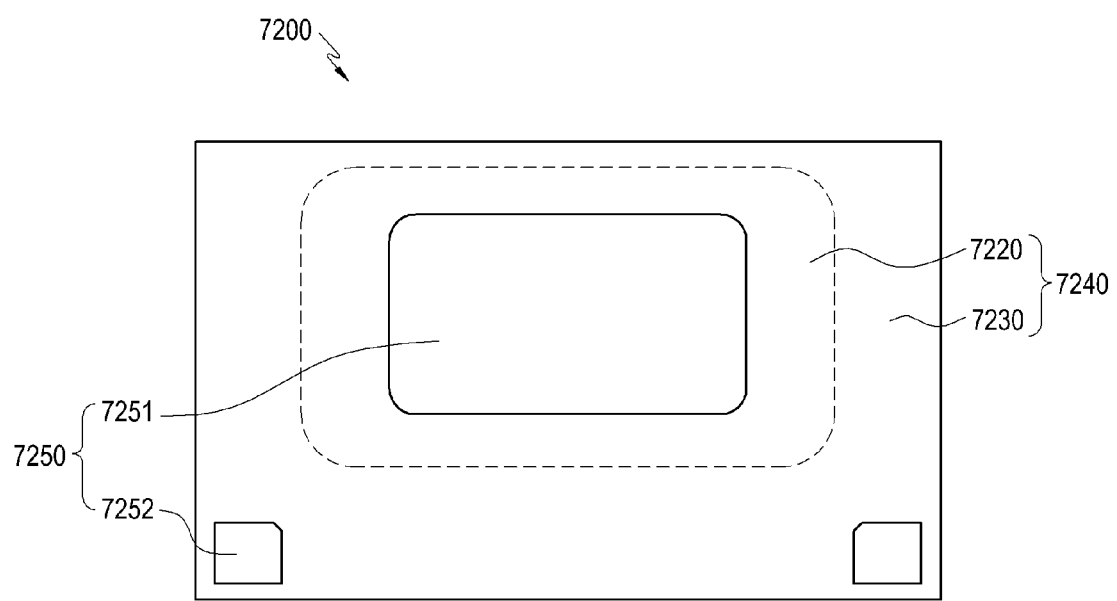
FIG. 20 is a plane view of an exemplary embodiment of a lower case including a passage corresponding to the mounting location of an additional component to the LCD module.

FIG. 20 is a plane view of an exemplary embodiment of a lower case whose passage is formed according to the mounting location of the additional component to the LCD module. In FIG. 20, passages are formed corresponding locations of the additional components mounted on the LCD module 1000, and the additional component main board 7510 and speakers 7520 are mounted on the LCD module 1000 at the points shown in FIG. 19. Specifically, the collective passage 7250 of the lower case 7200, includes a first passage 7251 and a second passage 7252. The main board 7510, having external power signal converting power circuit, passes through the first passage 7251, located on a substantially middle portion of the lower case 7200, and is mounted on the LCD module 1000.

After being mounted on the LCD module 1000, the main board 7510 is located adjacent to the lower case 7200. Since the main board 7510 emits a large amount of heat during the receiving of the power signal, the lower case 7200 can include material of high thermal conductivity. Specifically, the collective covering portion 7240 of the lower case 7200 includes a heat dissipation portion 7220 and a thermal insulating portion 7230. Namely, the heat dissipation portion 7220 includes a metal material, to emit heat effectively out of the LCD device 10. However, if the whole lower case 7200 is a heat dissipation portion, the heat can be transmitted to the edge portion of the LCD device 10 where the ultimate customer may touch frequently. Thereby the customer can be in danger of receiving a burn. Accordingly, the heat dissipation portion 7220 is in the middle portion of the lower case 7200, while the thermal insulating portion 7230 surrounds around the heat dissipation portion 7220 to isolate the customer from the heat.

Although not depicted in FIG. 20, there may be an external component, connecting the LCD module 1000 and the heat dissipation portion 7220. The external component is connected to the light source module 340 on the LCD module 1000 by passing through the lower case 7200. Since the external component can transmit heat of the light source 341 to the outside of the LCD device 10, the heat dissipation portion 7220 of the lower case 7200, connected to the external component, may enhance thermal stability of the LCD device 10.

In FIG. 20, the speakers 7520 pass through the second passage 7252 of the lower case 7200 in the vicinity of the lower corners of the lower case 7200, to be mounted on the LCD module 1000. The speakers 7252 may be located apart from the main board 7510 and be placed in the vicinity of the edges of the lower case 7200, to deliver sound coinciding with the views displayed on the LC panel 100, effectively. The edges of the lower case 7200 have the thermal insulating portion 7230, so as to have a limited effect of heat.

Figure 21:
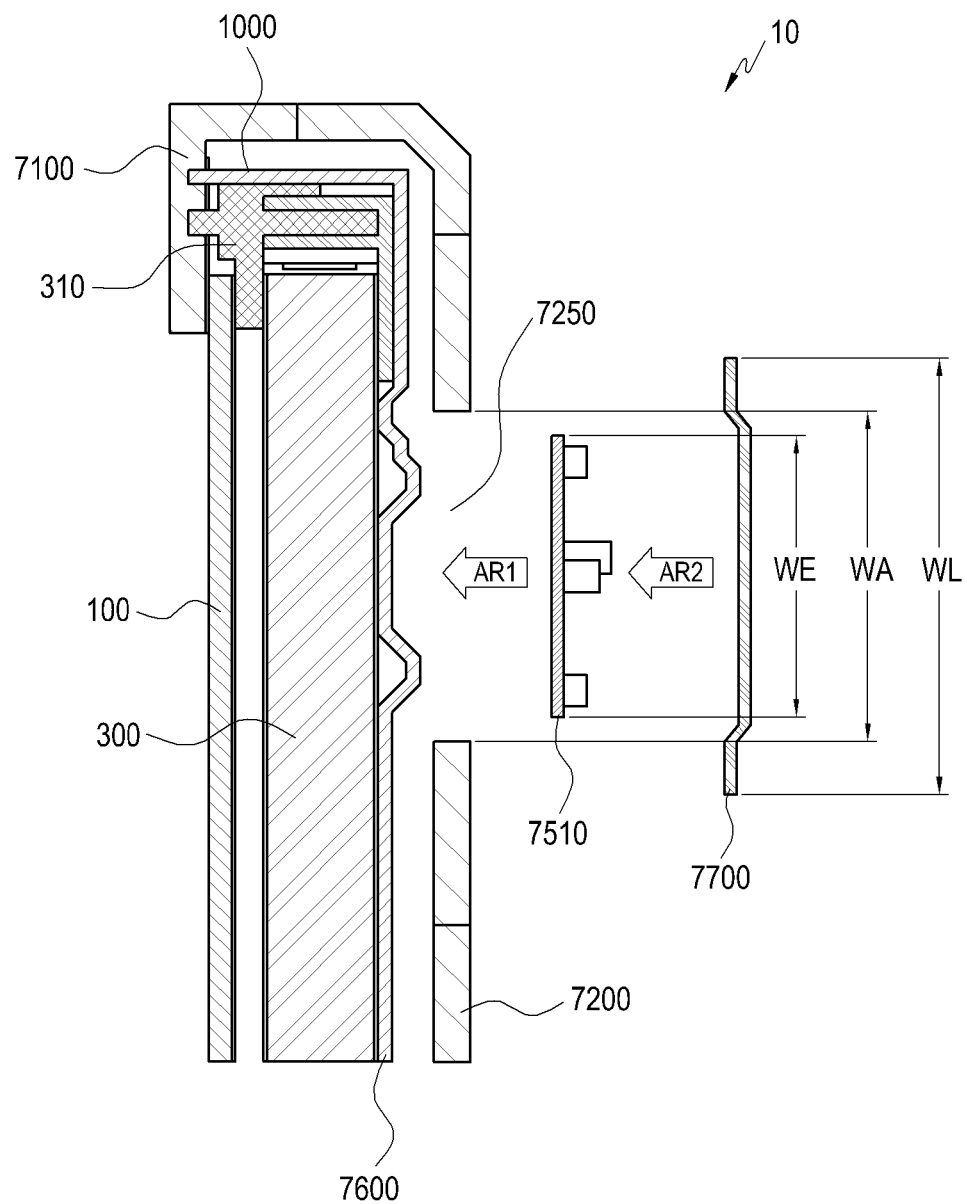
FIG. 21 is a cross-sectional view of an exemplary embodiment of assembling an LCD device including an additional component and a lid, after the LCD module of FIG. 19 is combined with the lower case of FIG. 20, taken along line XXI-XXI' of FIG. 19.

FIG. 21 is a cross-sectional view of an exemplary embodiment of assembling an LCD device whose additional component and a lid is assembled after the LCD module of FIG. 19 is combined with the lower case of FIG. 20, the cross-sectional view is taken along line XXI-XXI' of FIG. 19. In FIG. 21, the LCD module 1000 is, as explained with FIG. 17, the assembled structure where the LC panel 10, the intermediate support 310, and the backlight assembly 300 are assembled on and with the upper case 7100. However, the LCD module 1000 may be, as shown in FIG. 14, an assembled structure that an upper cover (not shown) combined with the backlight assembly 300 to make the upper case 7100 isolated. In FIG. 21, the lower case 7200 receives the LCD module 1000 and is combined with the upper case 7100, where the process is done by the LCD module manufacturer. Afterwards, the LCD device manufacturer assembles additional components to a part of the LCD module 1000, which is exposed by the passage 7250 of the lower case 7200.

As shown in FIG. 21, the main board 7510, one kind of the additional component, is assembled with the additional component mounting member 7600 along a direction of AR1 and via passage 7250 of the lower case 7200. As shown in FIG. 21, since a width WE of the main board 7510 is less than the width WA of the passage 7250 of the lower case 7200, the main board 7510 can easily pass through the passage 7250 to be mounted on the additional component mounting member 7600. After the additional component is mounted on the mounting member, externally exposed additional component main board 7510 can be hidden by moving the lid 7700 of the LCD device 10 along the direction of AR2 to the lower case 7200 for assembling. Since a width WL of the lid 7700 is wider than the width WA of the passage 7250, hiding the inside of the LCD device 10 with the lid 7700 is easily accomplished.

Figure 22:
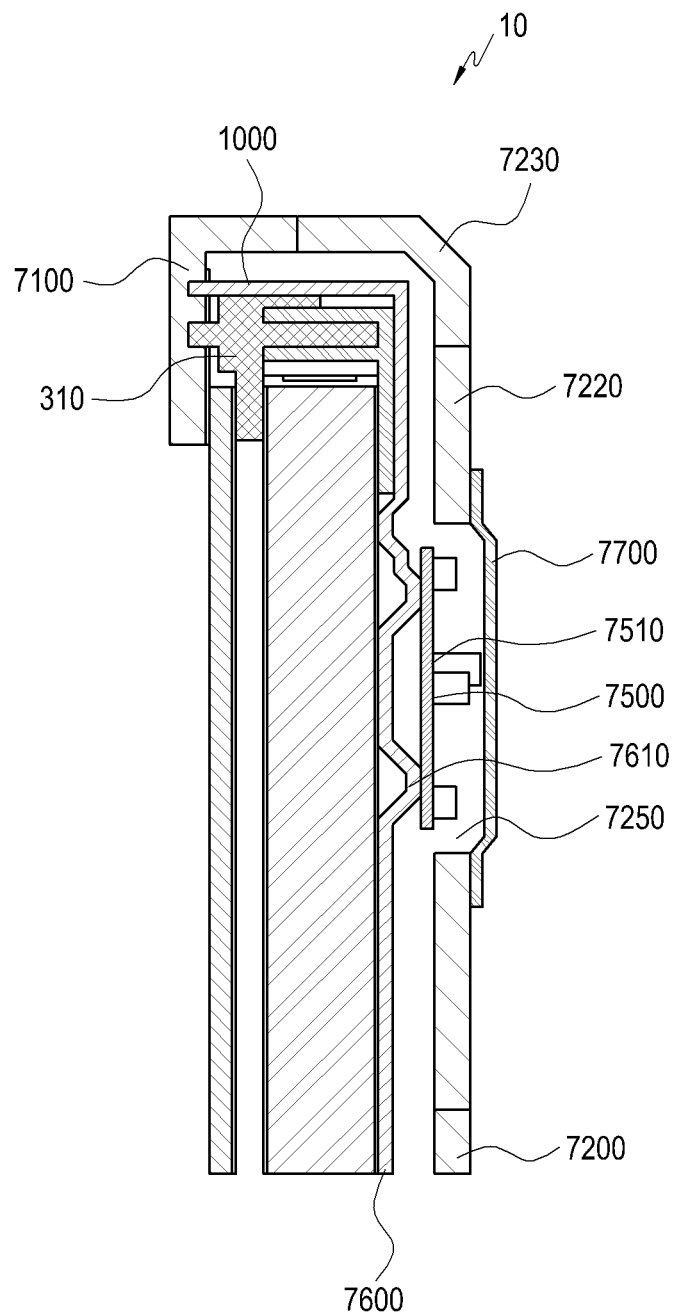
FIG. 22 is the cross-sectional view of the LCD device assembled in the process indicated in FIG. 21.

FIG. 22 is the cross-sectional view of the LCD device where the assembling process of FIG. 21 is finished. In FIG. 22, the additional component 7500 is mounted on the protruded mounting portion 7610 of the mounting member 7600 and overlap with the width direction of the lower case, thereby the thickness of the whole LCD device 10 is reduced.

The additional component 7500 of FIG. 22 is the main board 7510 that may emit a lot of heat. For emitting heat, the lid 7700 of the LCD device 10 includes thermally conductive material. Also, an adjacent area to the passage 7250 includes a metal material to form heat dissipation portion 7220 of the lower case 7200. Thus, the combination of the lid 7700 and the heat dissipation portion 7220 can accommodate effective heat release. In the vicinity of the heat dissipation portion 7220, the thermal insulating portion 7230 is present to keep the viewers safe from heat injury and, together with the upper case 7100 which includes the same or similar material with the thermal insulating portion 7230, limits the heat transmission.

Figure 23:
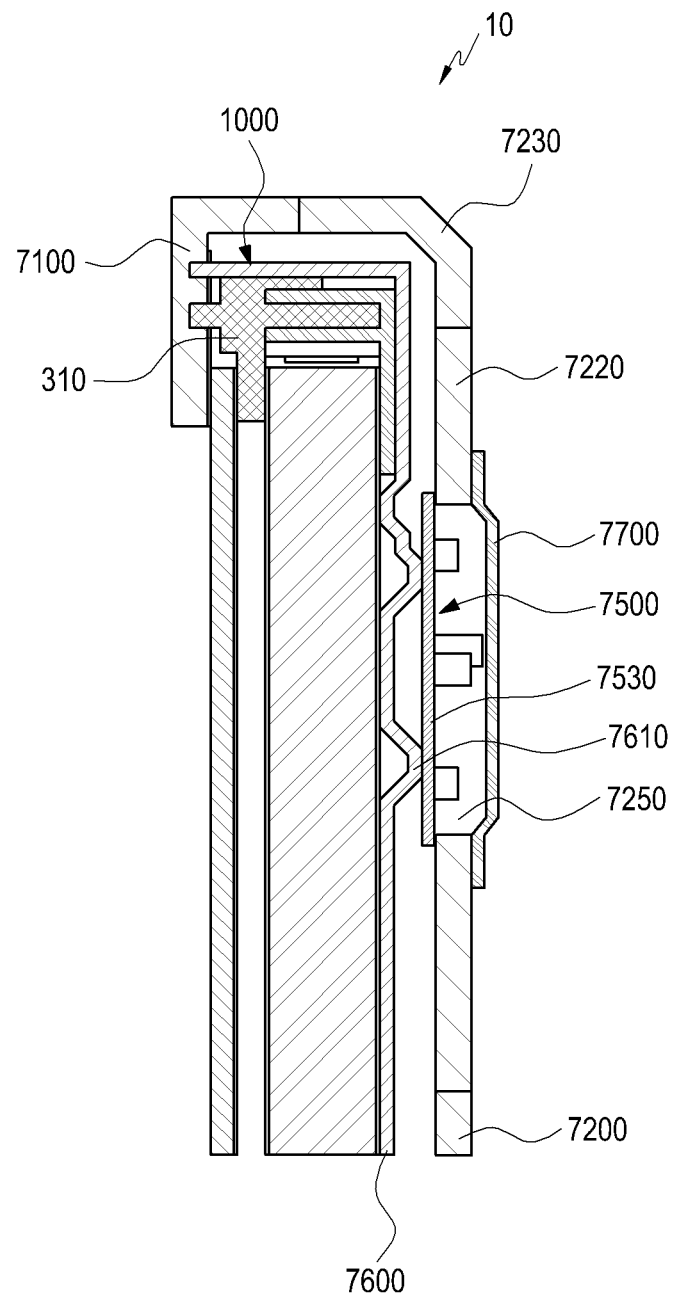
FIG. 23 is a cross-sectional view of an exemplary embodiment of a LCD device where a width of the additional component shown in FIG. 22 is larger than a width of the passage of the lower case.

FIG. 23 is a cross-sectional view of an exemplary embodiment of a LCD device where a width of the additional component of FIG. 22 is wider than the width of the passage of the lower case. Referring to FIG. 23, since the additional component 7500 is wider than the width of the passage 7250 of the lower case 7200, the additional component 7500 can be passed through the passage by slanting the additional component 7500. Afterwards, a substrate 7530 of the additional component 7500 is moved horizontally to be arranged on a mounting portion 7610 of the mounting member 7600.

In addition, the substrate 7530 of the additional component 7500 is suppressed by the lower case 7200 for fixation. By the suppression, the substrate 7530 of the heat emitting additional component 7500 contacts the metal heat dissipation portion 7220 of the lower case 7200 to accommodate heat dissipation of the LCD device 10. Alternatively, the substrate 7530 has a grounding pattern (not shown) which contacts the lower case 7200. The contact point of the substrate 7530 is a heat dissipation portion 7220 which includes a metal material, to secure electrical stability of the LCD device 10.

Figure 24:
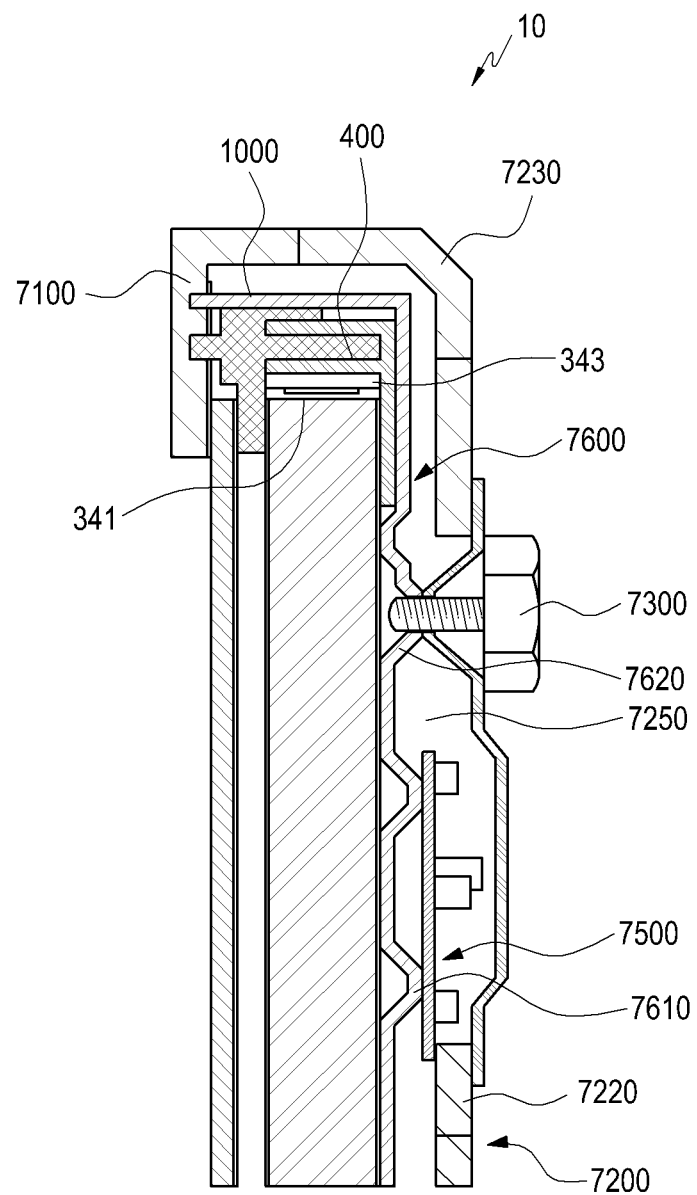
FIG. 24 is a cross-sectional view of an exemplary embodiment of a LCD device including an external component mounting member combined with an additional component mounting member shown in FIG. 22.

FIG. 24 is a cross-sectional view of an exemplary embodiment of a LCD device whose external component mounting member is formed together with additional component mounting member of FIG. 22. The passage 7250 of the lower case 7200, shown in FIG. 24, exposes the plurality of additional component mounting portions 7610, and an external component mounting portion 7620 of the additional component mounting member 7600. Both the additional component 7500 and the external component 7300 are assembled by the LCD device manufacturer. Since the components 7300 and 7500 are assembled with the LCD module 1000 via passage 7250 of the lower case 7200 which is pre-assembled with the LCD module 1000, the assembling process is simple Additionally, a height in the z direction of the additional component 7500 and the external component 7300 are accommodated in the passage 7250 of the lower case 7200, to lessen the overall thickness of the LCD device 10.

The heat dissipation portion 7220 of the lower case 7200 is in the vicinity of the passage 7250 and accommodates a heat release originated from either the additional component 7500 such as main board 7510, converting the electrical energy to thermal energy, and light source 341 such as LED. In detail, heat of the additional component 7500 can be released by direct contact with the heat dissipation portion 7220 of the lower case 7200 while the heat of the LED 341 is dissipated through the power source substrate 343, the LGP support 400 and the metallic additional component mounting member 7600.

External component 7300 is an instrument for fixing the whole LCD device 10 to either a building or a separated installation device and, considering gravity, is located at an upper side of the LCD device 10. Specifically, the external component 7300 may be further towards the upper side of the LCD device 10 than the additional component 7500. As described, the external component 7300 may be located on the additional component mounting member 7600. However, the external component 7300 may be located on other LCD module mounting member 6000.

According to the invention, the LCD module 1000 and the LCD device 10 has a LGP support 400 exposing the reflector 360, an LCD mounting member 6000 or 7600 connecting opposed LGP supporting pieces, and the passage 7250 extending through a thickness of the lower case 7200 to make the LCD device 10 thin and light with a simplified manufacturing process.

The plurality of LGP supporting pieces 410, 420, 430 and 440, each of which supports the edge of the LGP 330, are combined together to form a closed polygon shape. The closed polygon shape has the opening 470 at the inner area thereof to expose the middle portion of the reflector 360. Further, the connection piece 490, interconnecting adjacent LGP supporting pieces, is placed to receive (e.g. overlap) portions the LGP 330 together with the reflector 360. Thus, the whole backlight assembly 300, the LCD module 1000 and the LCD device 10 can be compact and light.

The LGP supporting pieces 410, 420, 430 and 440 include a material having a heat transfer coefficient as high as 15 W/mK, and are connected to the lower case 7200, exposed to outside of the LCD device 10. Thus, the heat originated from the light source module 340 on the peripheral portion 480 of the LGP supporting pieces 410, 420, 430 and 440 is easily dissipated through the lower case 7200 to outside of the LCD device 10, to enhance the quality of the LCD module 1000 and the LCD device 10.

The LCD module mounting member 6000 and 7600 interconnecting oppositely positioned LGP supporting pieces is placed at the back side of the LCD module 1000, and is connected to an external component 7300 while the lower case 7200 is interposed between the external component 7300 and the LCD module 1000. Thus, the LCD device 10 can be compact and light.

The LCD module manufacturer provides the LCD module 1000 and the lower case 7200 which is adjacent the backlight assembly 300 and has the cutout passage. The LCD device manufacturer mounts the additional component 7500 such as the main board 7510 through the passage 7250. Hence, assembling and displacement of the additional component 7500 is made easy, the LCD device 10 gets compact and light, and the manufacturing cost of the LCD device 10 can be lowered.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A backlight assembly, comprising:
    a light source module emitting light;
    a light guide plate comprising edges and a middle portion, the edges including an incident surface adjacent to the light source module, and the middle portion encompassed by the edges; and
    a light guide plate support overlapping the edges of the light guide plate;
    wherein
    the light guide plate support comprises:
        a plurality of light guide plate supporting pieces connected to form a polygonal shape, and
        an interconnecting portion connecting adjacent light guide plate supporting pieces to each other,
        each light guide plate supporting piece comprising a light guide plate supporting portion, overlapping the edges of the light guide plate and comprising:
            a light guide plate supporting surface facing the lower surface of the edges of the light guide plate; and
            a peripheral portion extended from the light guide plate supporting surface in an opposite direction from the middle portion of the light guide plate,
            wherein
                the light guide plate supporting surfaces and the peripheral portions of the light guide plate supporting pieces of the light guide plate support are substantially on a same plane, and
                the peripheral portions of the light guide plate supporting pieces of the light guide plate support comprise a connecting piece reception portion open in a direction extending perpendicular to the same plane,
        the interconnecting portion comprises:
            a connecting piece comprising an anchor disposed in the connecting piece reception portion such that the connecting piece is fixed on each corner of the light guide plate support and fixed to both of the adjacent light guide plate supporting pieces, respectively, and
            peripheral portion side surfaces of the adjacent light guide plate supporting pieces contacting each other to define a jointing portion,
            wherein the connecting piece overlaps the jointing portion such that a portion of the jointing portion is exposed by the connecting piece.

2. The backlight assembly of claim 1, wherein light guide plate supporting surface side surfaces or the peripheral portion side surfaces of the adjacent light guide plate supporting pieces are connected to each by friction stir welding.

3. The backlight assembly of claim 2, wherein the interconnecting portion further comprises a jointing area which includes materials of the adjacent light guide plate supporting pieces mixed together.

4. The backlight assembly of claim 1, wherein the connecting piece overlaps the peripheral portion side surfaces of the adjacent light guide plate supporting pieces.

5. The backlight assembly of claim 4, wherein the connecting piece is in the peripheral portions of the adjacent light guide plate supporting pieces.

6. The backlight assembly of claim 5, wherein light guide plate supporting surface side surfaces are spaced apart from each other.

7. The backlight assembly of claim 5, wherein
    the light guide plate further comprises an effective luminance area, and
    the connecting piece comprises a light guide plate reception portion overlapped with a portion of the light guide plate which is outside of the effective luminance area.

8. The backlight assembly of claim 7, wherein the light guide plate further comprises a cut-off portion extending from a corner of the light guide plate toward the effective luminance area of the light guide plate.

9. The backlight assembly of claim 7,
    further comprising a light controller facing the light guide plate, the light controller controlling light emitted from the light guide plate and including an overhang protruded from a corner of the light controller; and
    the connecting piece further comprises a light controller securing post;
    wherein the overhang of the light controller is fixed to the light controller securing post and firmly fixes the light controller to the backlight assembly.

10. The backlight assembly of claim 1, wherein the connecting piece further comprises:
    a plurality of the anchor, each of the anchors being connected with one of the adjacent light guide plate supporting pieces; and
    an annexed portion at which the anchors meet each other.

11. The backlight assembly of claim 10, wherein the annexed portion comprises an outside exposure portion exposing the connecting piece to an outside of the light guide plate support.

12. The backlight assembly of claim 1, wherein the connecting piece reception portion of the peripheral portion of the light guide plate supporting portion comprises:
    a first mounting wall disposed perpendicular to the plane of the light guide plate supporting surface;
    a second mounting wall disposed perpendicular to the plane of the light guide plate supporting surface and spaced apart from the light guide plate supporting surface farther than the first mounting wall; and
    an embedding space formed between the first and second mounting walls and in which the anchor of the connecting piece is disposed.

13. The backlight assembly of claim 12,
    further comprising a power wiring providing signals to the light source module;
    wherein
    the light source module is between the light guide plate and the first mounting wall, and
    the power wiring is in the embedding space of the peripheral portion of the light guide plate supporting portion.

14. The backlight assembly of claim 13, further comprising an intermediate support and a liquid crystal display panel;
    wherein the intermediate support is between the light guide plate and the liquid crystal display panel, and includes a portion disposed in the embedding space of the light guide plate support.

15. The backlight assembly of claim 1, wherein the plurality of light guide plate supporting pieces define a closed polygon light guide plate support including an opening at an inner portion thereof.

16. The backlight assembly of claim 15, further comprising a reflector between the light guide plate and the light guide plate support.

17. The backlight assembly of claim 16, wherein the opening of the light guide plate support exposes a middle portion of the reflector to an outside of the backlight assembly.

18. The backlight assembly of claim 15, wherein the light guide plate support further comprises a back surface opposite to the light guide plate supporting surface, and the back surface is exposed to an outside of the backlight assembly.

19. The backlight assembly of claim 18,
further comprising a reflector disposed between the light guide plate and the light guide plate support;
wherein the opening of the light guide plate support exposes a middle portion of the reflector to the outside of the backlight assembly.

20. The backlight assembly of claim 1, wherein a total planar area of the light guide plate supporting surfaces of the light guide plate support is greater than about 10 percent of a total planar area of a lower surface of the light guide plate.

21. The backlight assembly of claim 20, wherein the area of the light guide plate supporting surfaces of the light guide plate support is less than about 70 percent of the area of the lower surface of the light guide plate.

22. The backlight assembly of claim 1, wherein the light guide plate is disposed non-overlapping with each connecting piece of the interconnecting portions and each peripheral portion of the plurality of light guide plate supporting pieces.

* * * * *